United States Patent [19]

Hardy

[11] Patent Number: 4,471,201
[45] Date of Patent: * Sep. 11, 1984

[54] WELDING APPARATUS AND METHOD

[75] Inventor: Jay C. Hardy, Somis, Calif.

[73] Assignee: Pressteel Company, Orange, Calif.

[*] Notice: The portion of the term of this patent subsequent to Jun. 2, 1998 has been disclaimed.

[21] Appl. No.: 237,453

[22] Filed: Feb. 23, 1981

Related U.S. Application Data

[63] Continuation-in-part of Ser. No. 957,318, Nov. 2, 1978, Pat. No. 4,271,346.

[51] Int. Cl.³ .............................................. B23K 9/04
[52] U.S. Cl. ........................... 219/76.14; 219/125.11; 219/159
[58] Field of Search .............. 74/600; 219/76.1, 76.14, 219/73.21, 125.11, 159, 73.2

[56] References Cited

U.S. PATENT DOCUMENTS

| | | | |
|---|---|---|---|
| 2,997,888 | 8/1961 | Rust | 74/600 |
| 3,305,663 | 2/1967 | Janssen | 219/73.2 X |
| 3,978,310 | 8/1976 | Gleason | 219/76.14 X |
| 4,271,346 | 6/1981 | Hardy | 219/76.14 |

Primary Examiner—Roy N. Envall, Jr.
Assistant Examiner—Catherine M. Sigda
Attorney, Agent, or Firm—Romney, Golant, Martin & Ashen

[57] ABSTRACT

An apparatus and method capable of applying weld material to metal parts on a generally automatic basis. The apparatus and method are uniquely adapted to apply weld material to the journals and crankpins and crank arms of an automotive type crankshaft on a generally automatic basis. The apparatus comprises a frame and a head stock and tail stock for rotatably supporting a crankshaft relative to the frame. A carriage is shiftable relative to the crankshaft and in a direction generally parallel to the central axis of the crankshaft. A welding torch is carried by the carriage and shiftable longitudinally and generally parallel to the central axis of said crankshaft. A torch positioning mechanism in said carriage includes a member simultaneously moveable in two mutually perpendicular directions by a drive mechanism which also causes rotation of the crankshaft. The movement of the member causes the welding torch to move in a generally true circular path so that the tip of the torch will closely follow to orbiting movement of the crank pins and the journals of the crankshaft. A modified form of torch positioning mechanism which uses a pair of rotating members to cause orbital movement of a welding torch type is also disclosed.

37 Claims, 21 Drawing Figures

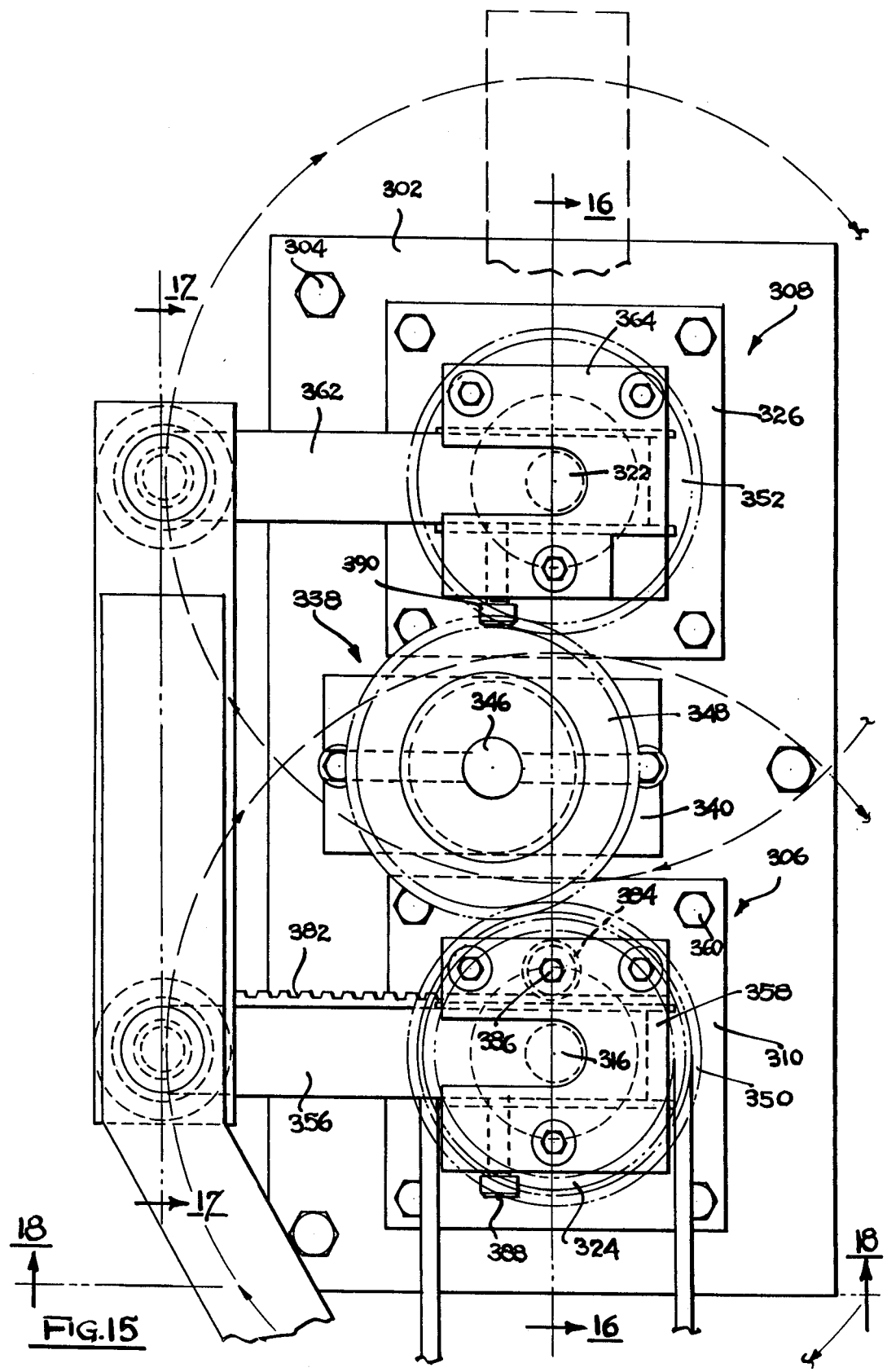

WELDING APPARATUS AND METHOD

RELATING APPLICATIONS

This application is a continuation-in-part of my copending application Ser. No. 957,318, filed Nov. 2, 1978 entitled "Welding Apparatus and Method", for which U.S. Pat. No. 4,271,346 was issued on June 2, 1981.

BACKGROUND OF THE INVENTION

1. Field of the Invention

This invention relates in general to certain new and useful improvements in apparatus and method for applying weld material to crankshafts and other metal parts, and more particularly, to an apparatus and method of the type stated in which a welding torch is capable of moving with respect to, and maintaining a closely spaced relationship to axially offset portions of a metal part, as for example the crank pins and journals of a crankshaft during rotation thereof.

2. Brief Description of the Prior Art

In recent years with the advent of more sophisticated hydrocarbon combustion engines, it has been necessary to provide an improved apparatus and method for welding the crankshafts of these engines. In many cases, the crankshafts are constructed so that they can be mounted in an engine block with a high degree of close tolerance with respect to other moving components. Consequently, these crankshafts require a considerable amount of time to maintain and thus are quite expensive.

In many cases, the bearings of the crankshaft, as well as the crank pins, become worn, and it is oftentimes necessary to build up the metal thickness of the crankshaft by adding a weld material in order to accomodate oversized bushings or the like in the engine block. Further, during maintenance and inspection procedures, it oftentimes becomes apparent that weakened areas may exist in the crankshaft and it is necessary to repair the weakened crankshaft by adding a weld material to various portions or to the entire crankshaft, in order to obviate the costly replacement of the shaft.

There have been several proposals to provide crankshaft welding apparatus. One such proposed apparatus is more fully described in U.S. Pat. No. 3,205,336 to Joseph Smith. While this patent discloses an apparatus which obviates many of the heretofore existing problems in crankshaft welding apparatus, it did not obviate the requirement of having a welding torch orbit, or at least follow axially offset portions of the crankshaft during the welding operation.

U.S. Pat. No. 3,978,310 to William Gleason also discloses an apparatus for arc welding crankshafts. In the Gleason patent, the problem of having the arc welding torch head follow axially offset portions of the crankshaft was obviated to some extent. However, the mechanism employed in the Gleason patent which permitted the torch to follow axially offset portions of the head was quite complex, thereby making the apparatus difficult to operate, relatively unprecise, and quite costly. The apparatus in the Gleason patent disclosed a carriage member which appeared to shift vertically in a somewhat "dancing" manner and has been characterized in the trade as a "dancing" carriage. Further, the mechanism for adjusting positional movement of the carriage to enable the torch head to closely follow the rotatable movement of the axially offset portions of the crank shaft was difficult to operate and not relatively effective. Consequently, the overall effectiveness of the apparatus taught in the Gleason patent was relatively low.

In addition to the foregoing, rotation of the crankshaft in the apparatus described in the Gleason patent was quite difficult and time consuming. If one of the mounting chucks which retained the crankshaft on the apparatus was released, the synchronism required in the apparatus was lost. Furthermore, it is difficult to maintain synchronism in the apparatus described in the Gleason patent when changing from one rod general diameter to another, particularly when the crankshafts are preheated normally to about 450° F. for welding. The apparatus of the Gleason patent also employed a counter-weight in the vertically shiftable carriage in the Gleason patent apparatus. This counter-weight is substantial and generally in the area of at least 300 lbs. which caused vibration when moved and decreased materially the overall efficiency of the apparatus.

One of the significant problems in the apparatus of the type taught in the Gleason patent is that the tip of the welding torch did not follow a truly circular path during the orbiting movement thereof. This was due to the fact that the employed carriage arrangement caused the torch to tip or shift slightly angularly during movement thereof. As a result, weld material was applied in greater thickness to one portion of the crankshaft than another circumferentially second portion thereof.

OBJECTS OF THE INVENTION

It is, therefore, a primary object of the present invention to provide an apparatus for applying weld material to metal parts on a generally automatic basis requiring little operator intervention or contact.

It is also an object of the present invention to provide an apparatus of the type stated to apply weld material to journals or crank pins, or both, of a crankshaft with an improved mechanism for causing a tip of an arc welding torch to follow the rotatable movement of axially offset portions of the crankshaft.

It is another object of the present invention to provide an apparatus of the type stated in which the crankshaft can be rotated in a desired position to accomodate crankshaft journals of various axially offset dimensions without effecting synchronization between crankshaft rotation and a mechanism for causing the welding torch to follow the axially offset portions of the crankshaft.

It is a further object of the present invention to provide an apparatus of the type stated which is capable of handling crankshafts and other metal parts of a wide variety of sizes.

It is an additional object of the present invention to provide an apparatus which can be manufactured at a relatively low cost compared to prior art welding apparatus and which can be operated on a highly efficient basis in order to provide weld material to metal parts in generally precise, controlled locations thereon.

With the above and other objects in view, my invention resides in the novel features of form, construction, arrangement, and combination of parts presently described and pointed out in the claims.

SUMMARY OF THE DISCLOSURE

The present invention generally relates to an arc welding apparatus which is capable of applying a weld material to metal parts, as for example steel rods or the like. The apparatus of the invention is uniquely adapted to apply weld material to metal parts having axially extending portions and axially off-set portions, as for example, the journals or the crank pins or both, forming part f a crankshaft of the type normally used in hydrocarbon combustion engines, as for example, automotive vehicle engines.

Generally, the crankshafts of such engines are comprised of a plurality of axially aligned crank pins which have their central axis coincident with the central axis of the entire crankshaft. The crankshaft further comprises a plurality of journals (often referred to as "piston rod journals" or "rod journals") which are capable of rotating in an orbit which is axially spaced from the axial center line of the crankshaft. These, journals are connected to the crank pins by means of outwardly struck crank arms.

The apparatus of the present invention comprises a main control housing which also houses many of the drive components forming part of the present invention. The control housing includes a first chuck or head stock extending outwardly therefrom for receiving and retentively, but nevertheless removably holding one end of a crankshaft. The control housing is mounted on a main frame and also shiftably mounted on the frame is a tail stock assembly which includes a second chuck for removably journaling the other end of the crankshaft.

As indicated, the main drive mechanism is mounted within the control housing and generally comprises an electric motor which is connected to a first drive shaft through suitable mechanical coupling. In this case, the first drive shaft is operatively connected to the first chuck for rotation of the crankshaft which is to be welded. The electric motor is similarly connected to a second drive shaft through suitable mechanical coupling which, in turn, extends to a shiftable carriage mechanism for driving a torch position coordinating mechanism in the carriage.

A clutch mechanism is mounted between the first drive shaft and the drive motor in order to permit adjustment and slight rotation of the crankshaft when mounted. A second clutch mechanism is located between the drive motor and the second drive shaft. Generally, the crankshafts are oftentimes preheated, typically to about 450° F. and hotter prior to welding of the same. In many situations, it is necessary to slightly rotate the crankshaft and this, of course, presents some difficulty when the crankshaft has been preheated. In accordance with the present invention, the clutch mechanism permits the crankshaft to be rotated slightly to permit minor adjustments to synchronization or to permit rapid change from one crank journal to another. Heretofore, this was not possible in the prior art mechanism and any manual rotation of the crankshaft for purposes of adjustment or synchronization at all was not only dangerous, but quite time consumming.

In addition to the above, it is possible to secure the crankshaft in such manner that it would not be inadvertently uncoupled from one of the chucks during operation thereof. In many of the prior art crankshaft welding mechanisms, it was possible for the crank shaft to "walk" out of the chuck, that is to shift slightly axially during rotation and thereby become uncoupled and/or out of synchronization.

During the mounting of the crankshaft, difficulty was also encountered in the prior art apparatus in that the crank shaft was quite heavy, in many cases one thousand pounds or greater. During the mounting of the crankshaft, it is undesirable to have the chuck rotate at all. The present invention provides a disc brake which prevents rotation of the crankshaft or the chuck during set up or installation of a crankshaft in the apparatus. In this way, easy mounting is enabled. Furthermore, synchronization as hereinafter described, is maintained so that during the subsequent welding operation, the weld material is always applied to the proper portion of the crankshaft.

In the apparatus of the present invention, repositioning of the welding torch from one axially offset portion to another, e.g., from one crank journal to another can be accomplished in about ten seconds, whereas the same operation took about ten minutes, at very minimum in the prior art apparatus. Further, repositioning of the welding torch from a journal to a crank pin or from a crank pin to a journal can be accomplished in about five seconds; whereas, the same operation took, at very least, five minutes in the prior art apparatus. Moreover, such changes can be accomplished in the present invention by mere manipulation of controls by an operator; whereas, it was necessary to physically engage either the crankshaft or the torch or both and physically move these members in the prior art apparatus.

The carriage is shiftable on a generally horizontally disposed, longitudinally extending support member. Further, the carriage generally comprises an outer housing which carries the torch. The welding torch is preferably an arc welding torch and has a tip end which is capable of being positioned in close proximity to the crankshaft when the latter is removably mounted in the opposed chucks.

The torch positioning mechanism which is mounted within the cabinet of the carriage, is an X-Y torch positioning mechanism and is operable by the second drive means. In this case, the positioning mechanism has a shiftable element which is capable of shifting in two mutually perpendicular directions. Thus, the shiftable element is movable along a support rod in one direction and this support rod is carried by a slide shiftably mounted on support rods located in a perpendicular direction. Moreover, an arm extends from the slide to engage the torch and retentively hold the same. In this way, the tip end of the torch which applies the welding material, such as a weld metal can carefully follow the orbiting movement of various portions of the crankshaft.

In another embodiment of the invention, the torch positioning mechanism does not necessarily utilize two slidable members causing X and Y axis movements. In this other embodiment of the invention, a pair of rotating members are employed and which are driven by the second drive means. A mounting member extends between and is operatively connected to the rotating members so as to be rotatable therewith. The mounting member carries the welding torch so that the latter may move in an orbital path with respect to the crankshaft. The mounting member is perferably secured to extensible bars which are, in turn, mounted on the rotatable members in order to adjust the amount of throw or offset and thereby adjust the size of the orbital path.

The positioning mechanism of the apparatus of the present invention will enable the welding tip of the torch to always orbit the crankshaft in true circles. In this respect, the tip of the welding torch orbits the axial centerline of the crankshaft, e.g., the journals thereof. Moreover, since there is no shifting movement in the welding torch, that is a change in the angular position of the torch relative to the axis of the crankshaft, the tip of the torch will always follow generally true circular paths which will enable the proper amount of weld material to be applied to all portions of the crankshaft. While there may be non-linearities in the actual operation of many components of the apparatus, the circles defined by the torch tip may not be true circles, but beyond such non-linearities the torch tip will generally define true circles.

It should be understood that the apparatus of the present invention has been described in connection with arc welding torches which cause a melting of weld material by generation of an electrical arc between the torch tip and the crankshaft or other part to be welded. However, it should also be understood that the invention is operable with all forms of welding, as for example, gas welding and the like. Further, the apparatus could be equipped with a laser beam or similar heat generating source on the torch for creating the welding energy.

It should also be understood in connection with the present invention that while the invention has been described in connection with the welding of crankshafts, it could also be used in the welding of any member capable of being welded by any prior art welding apparatus, including,, for example, elongate rods having no offset portions. However, the apparatus of the invention is ideal in welding members having an elongate axially extending rod-like portion with axially offset portions formed thereon and which are capable of rotating with respect to the axial center line of the entire structure. The term "crankshaft" will be used in a broader sense to encompass various structures having similar sizes and shapes.

The apparatus of the present invention is essentially automatic in that various movements of a welding torch with respect to a crankshaft or other metal part can be accomplished by the apparatus without the necessity of having operating personnel physically engage either the torch or the crankshaft itself to cause any shifting movement. While the apparatus may be designed so that an operator of the apparatus may be required to initiate a movement, as for example, by actuation of a control feature on a control panel, the apparatus is nevertheless automatic in that it does not require personnel to physically engage movable portions of the apparatus, e.g., the welding torch or the carriage to cause movement thereof or to engage the part being welded, as for example, a crankshaft.

This invention possesses many other advantages and has other purposes which may be made more clearly apparent from a consideration of forms in which it may be embodied. These forms are shown in the drawings accompanying and forming part of the present specification. They will now be described in detail for the purpose of illustrating the general principals of the invention, but it is to be understood that such detailed descriptions are not to be taken in a limiting sense.

BRIEF DESCRIPTION OF THE DRAWINGS

Figure 1:
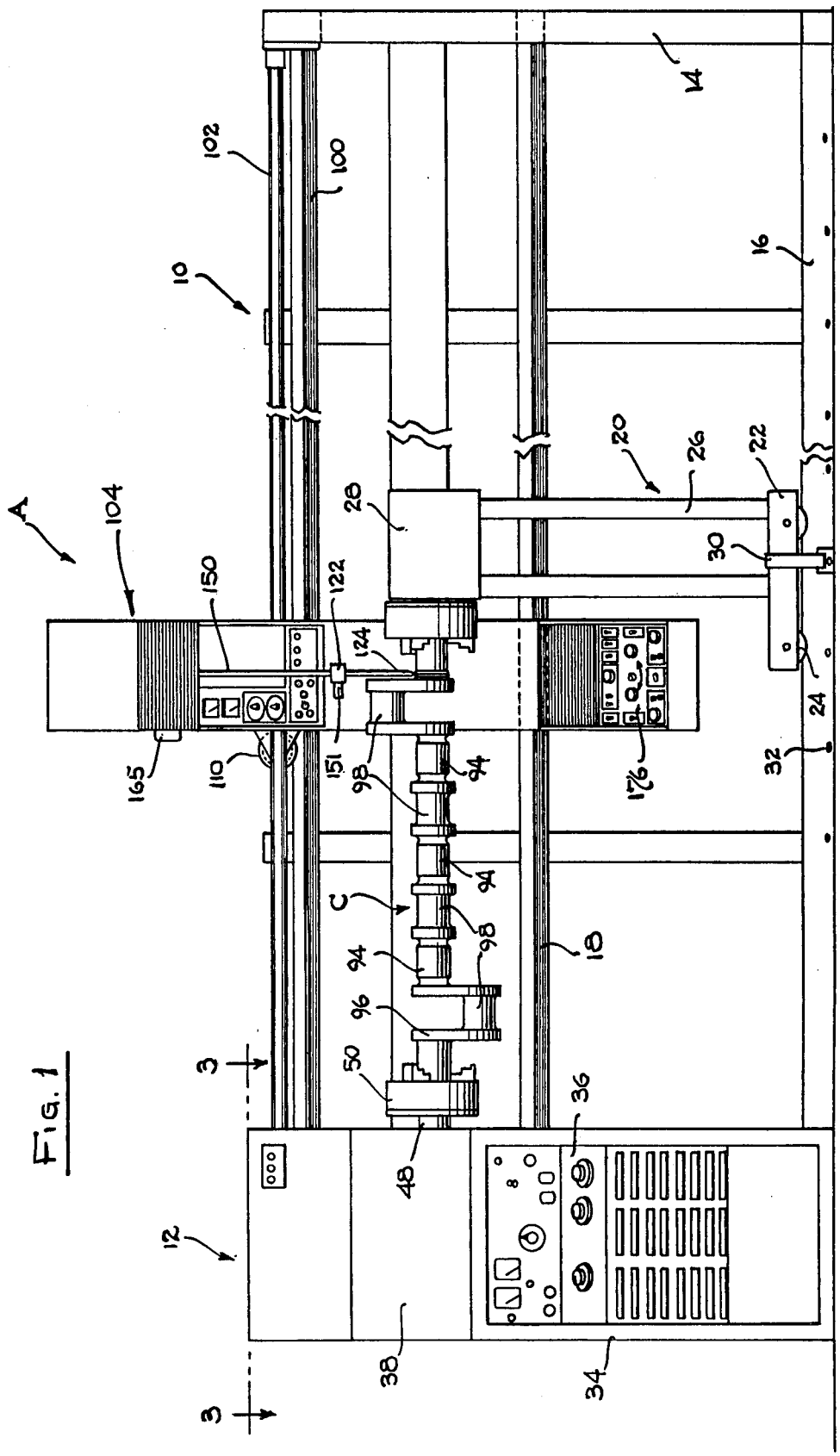
Figure 2:
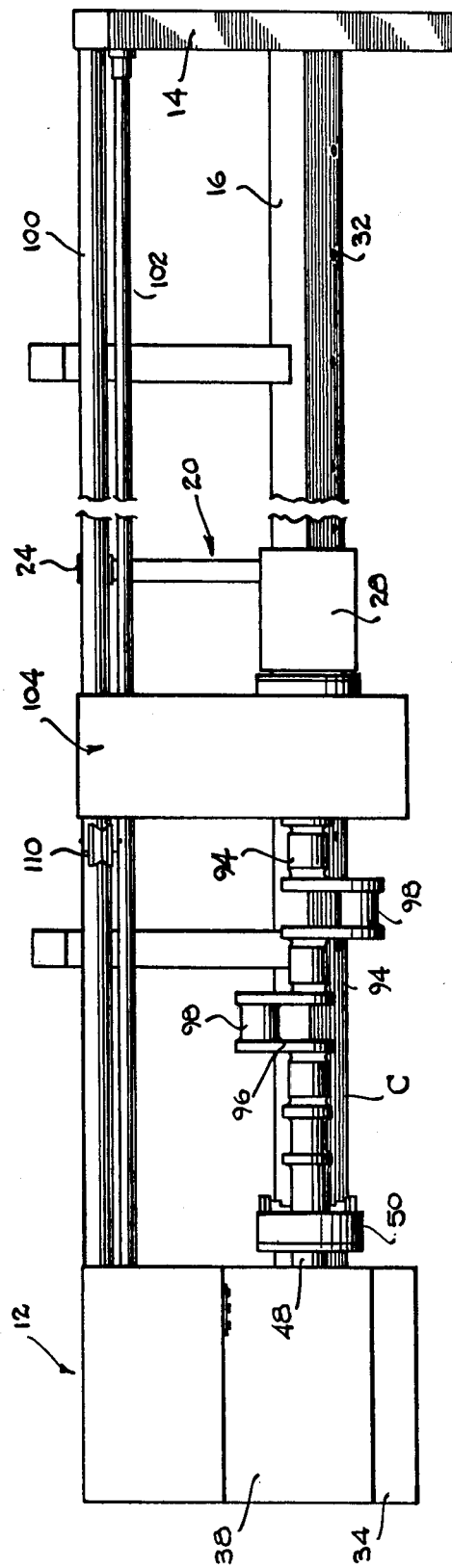
Figure 3:
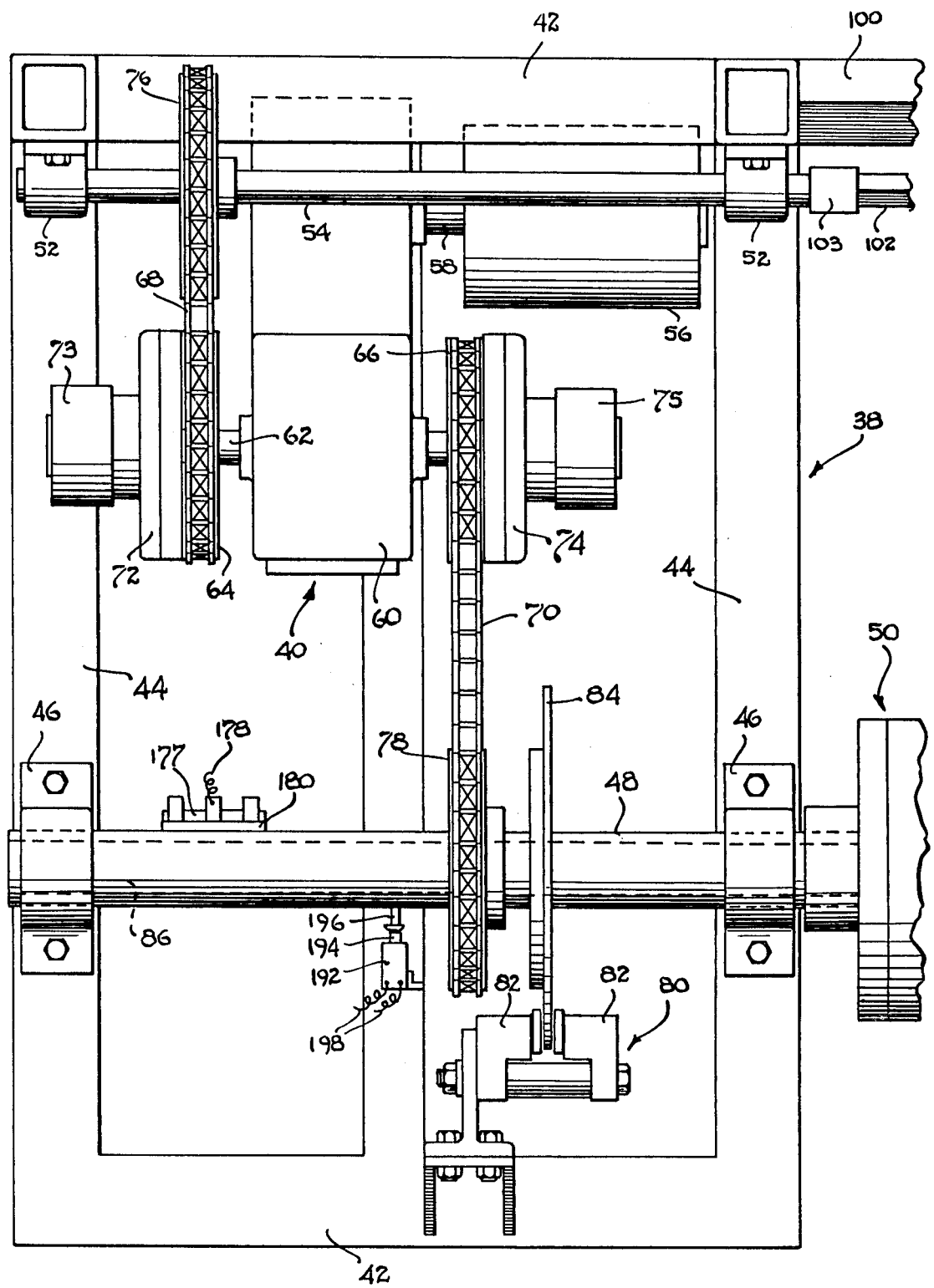
Figure 4:
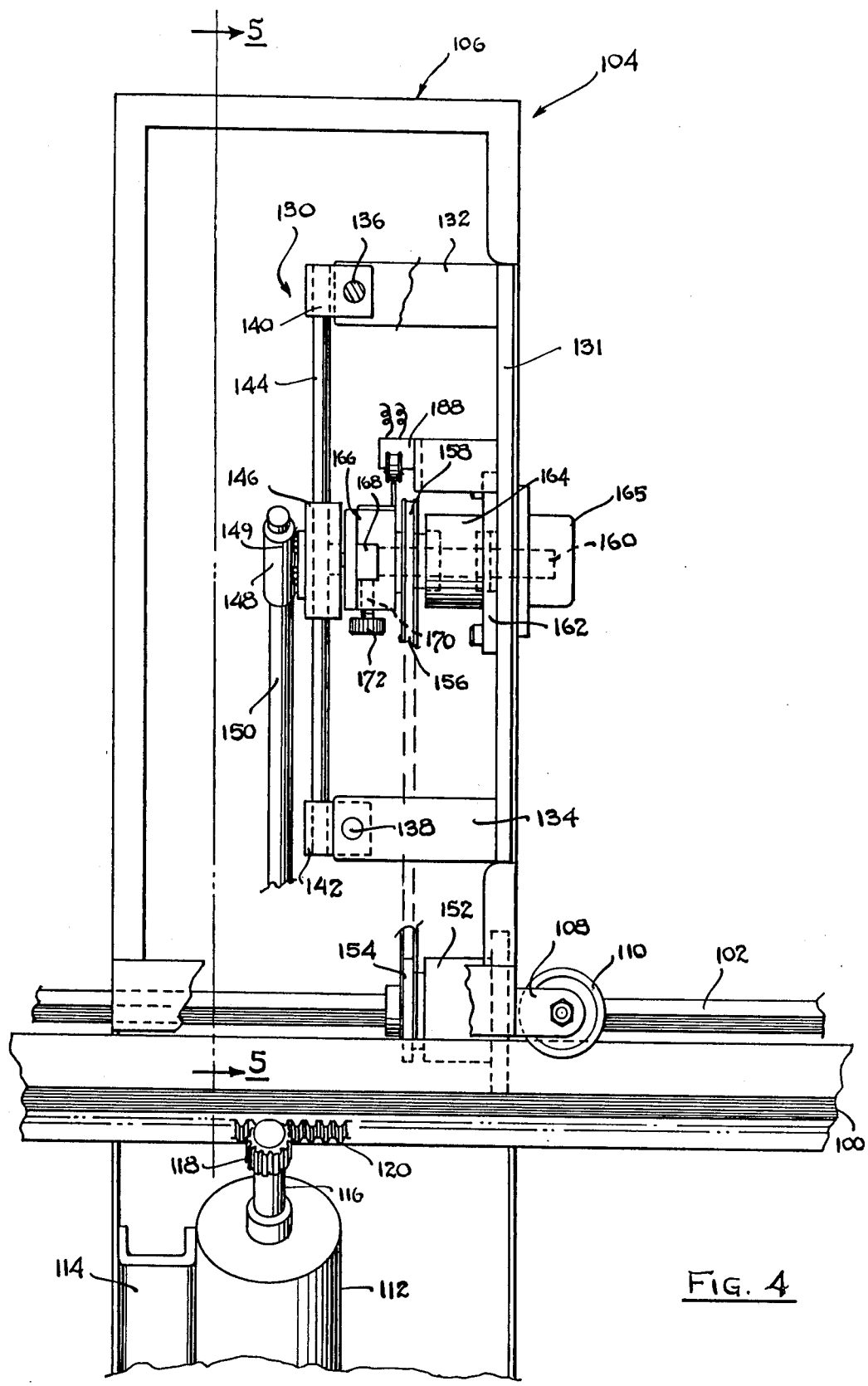
Figure 5:
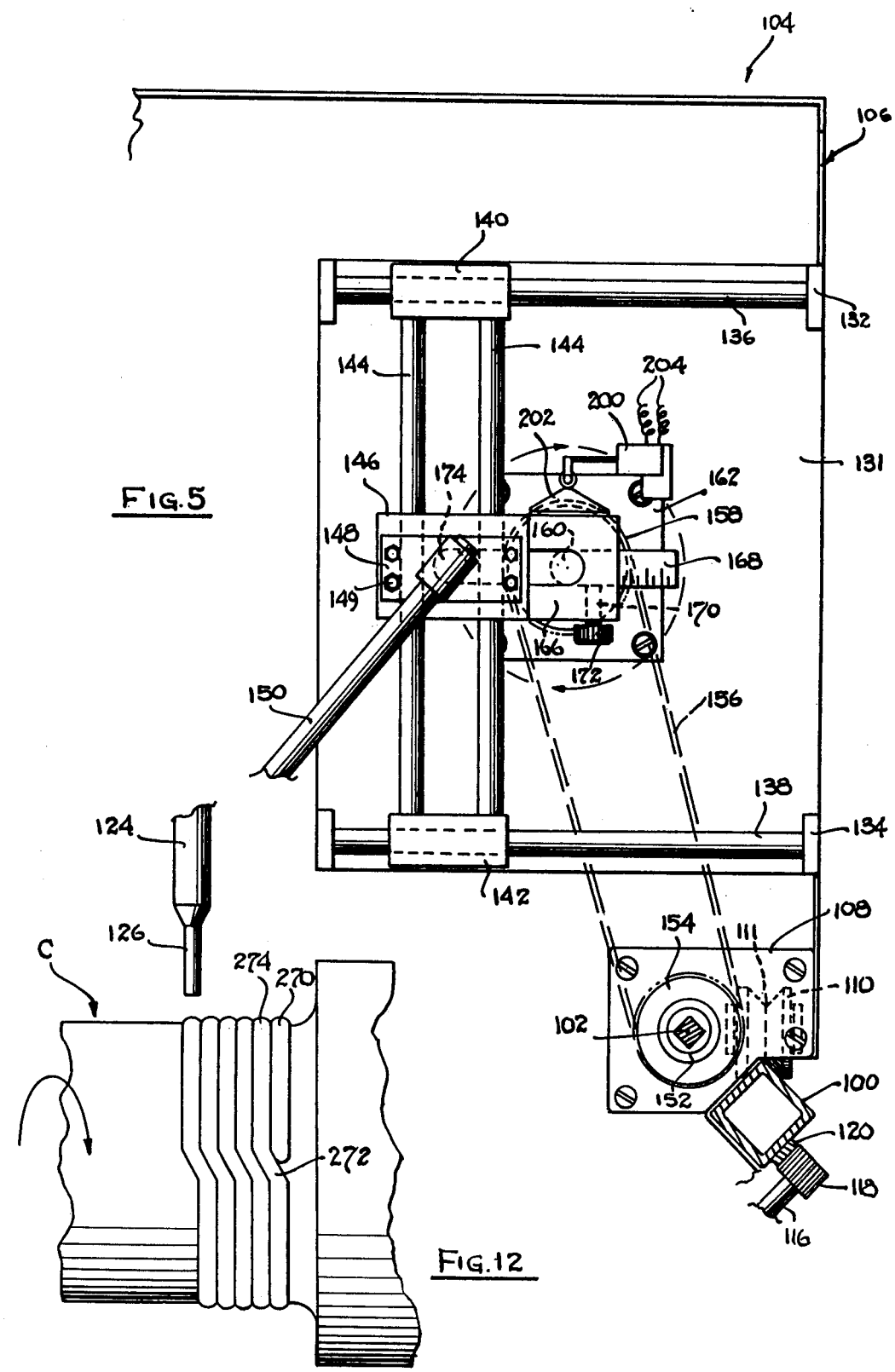
Figure 6:
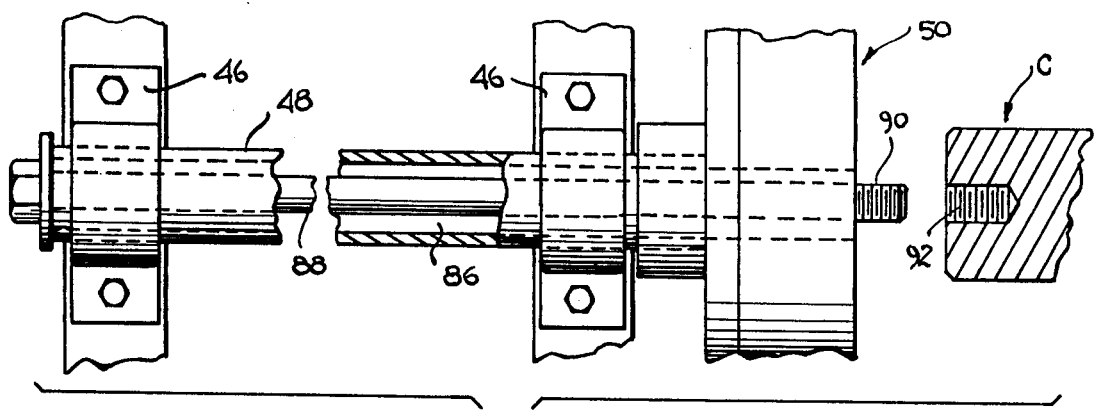
Figure 13:
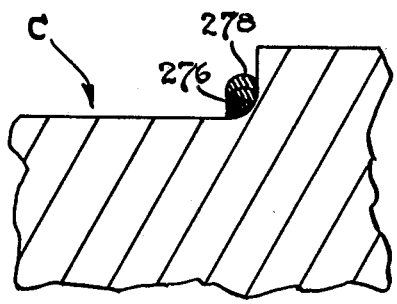
Figure 14:
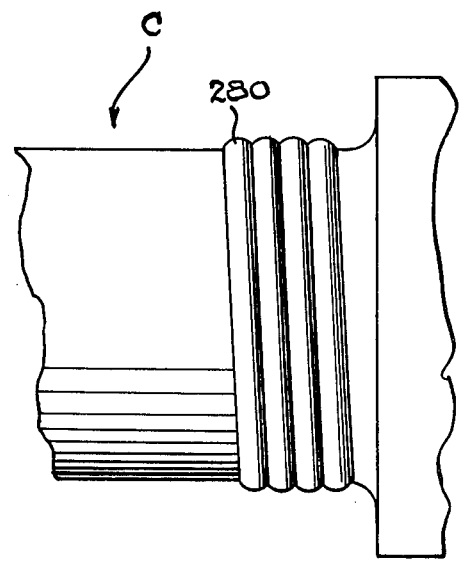
Figure 7:
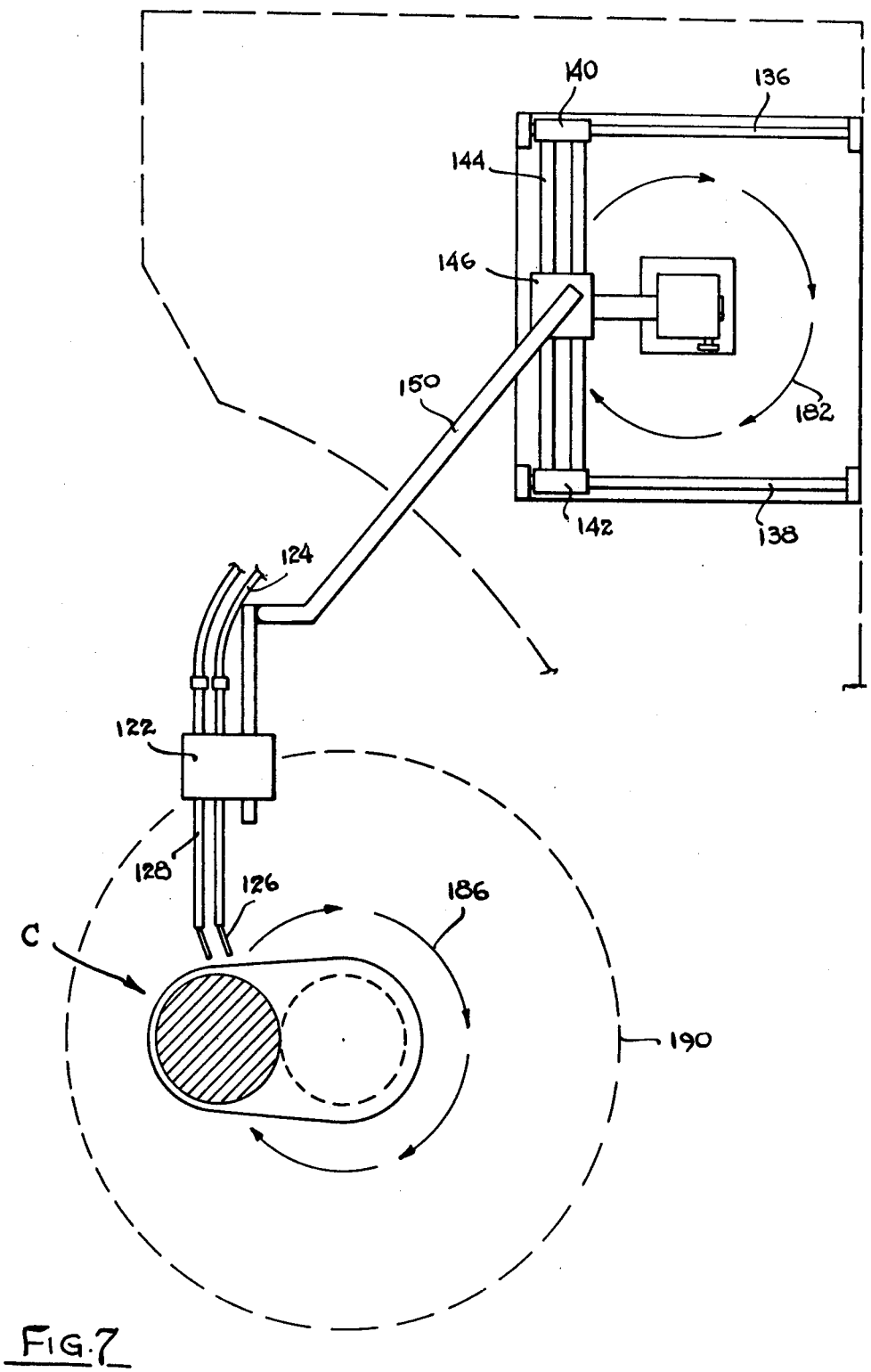
Figure 8:
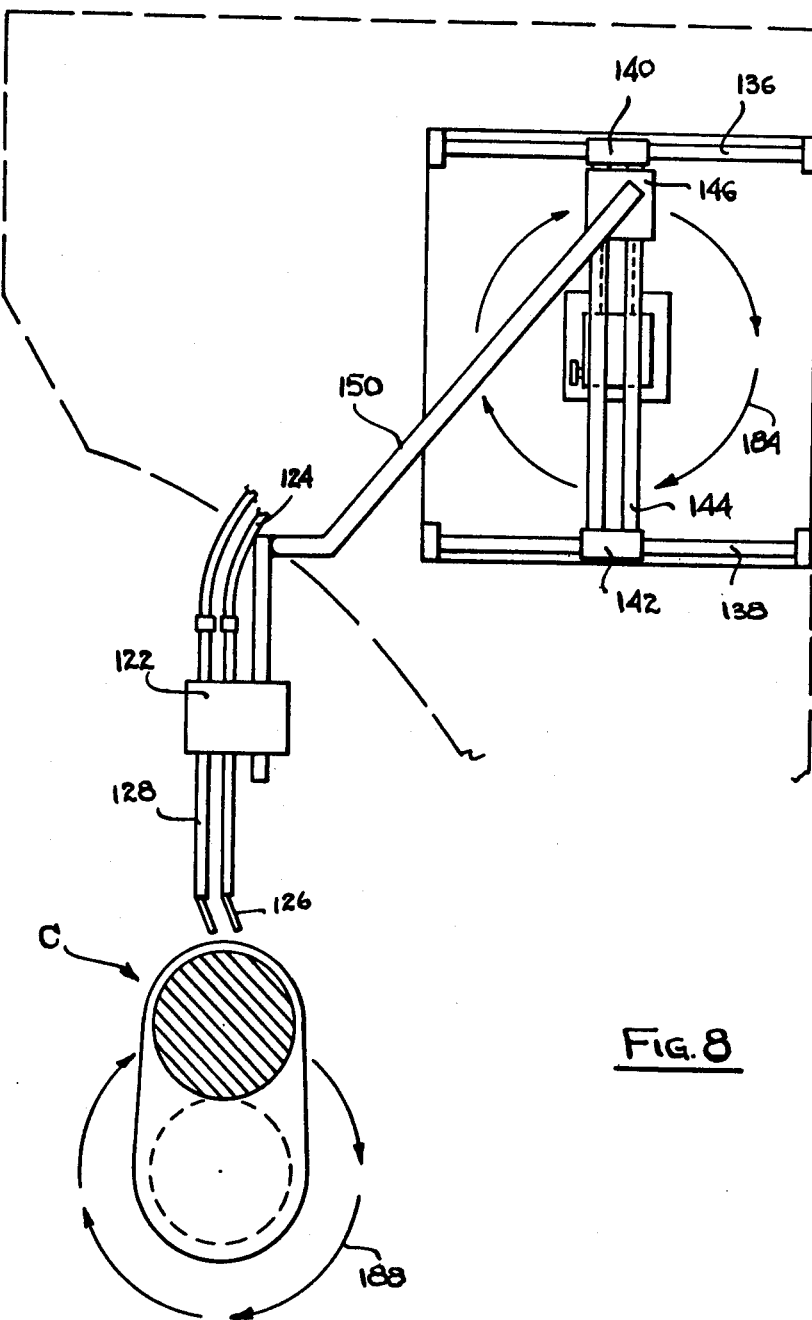
Figure 9:
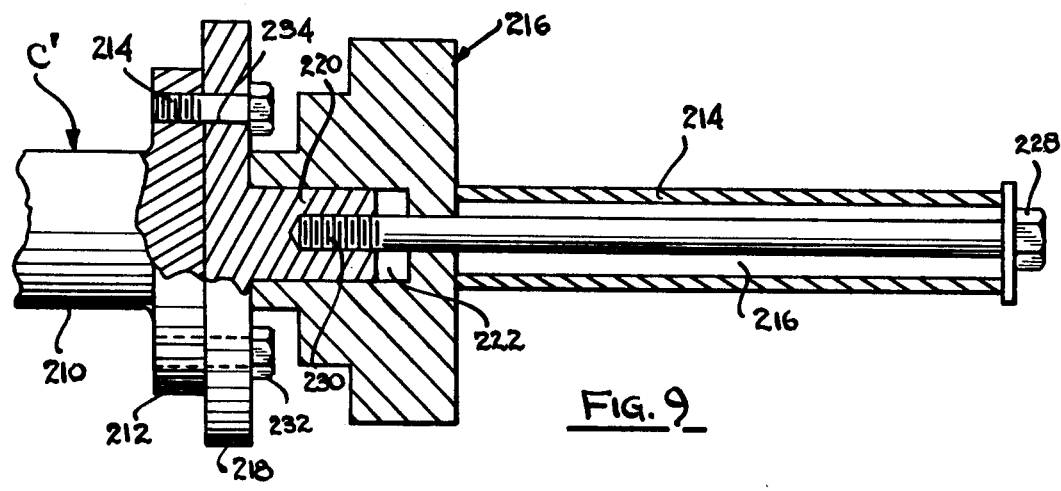
Figure 10:
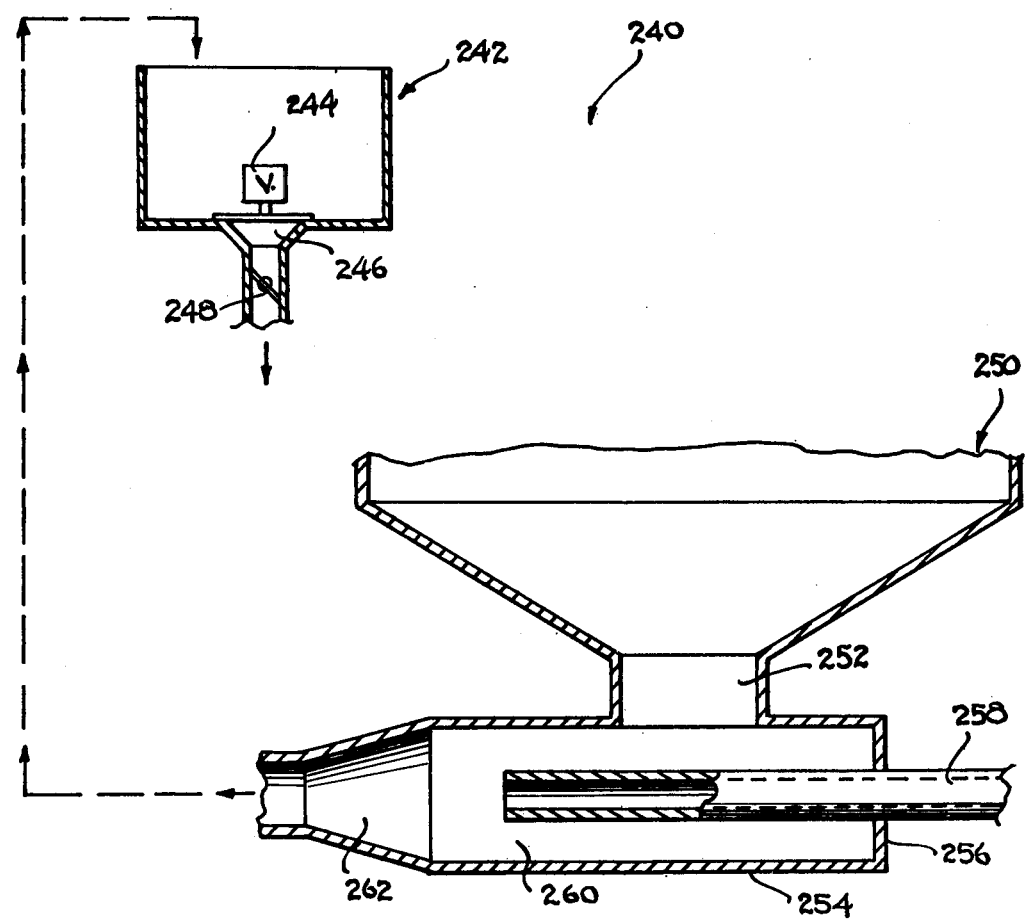
Figures 16, 17:
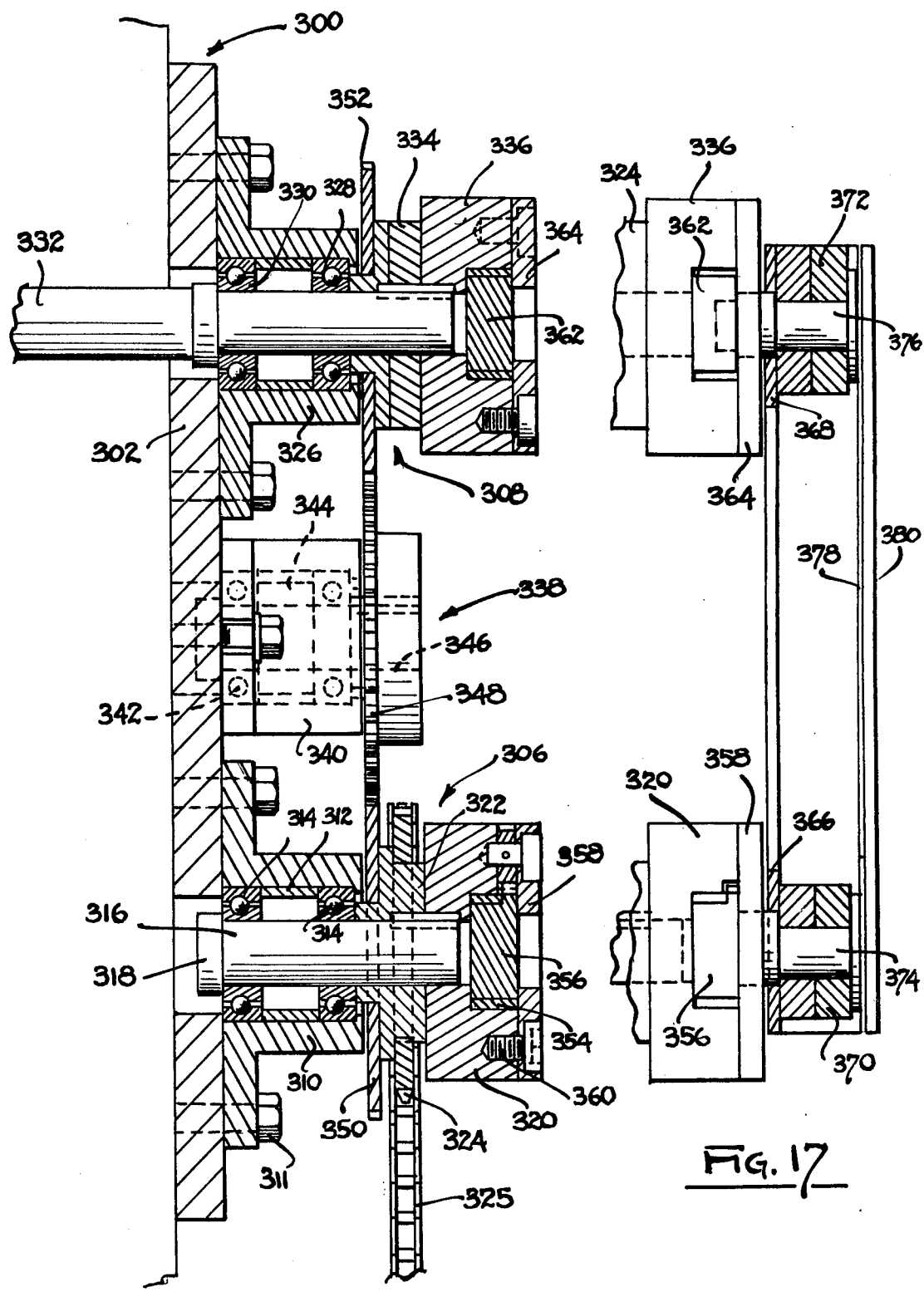
Figure 18:
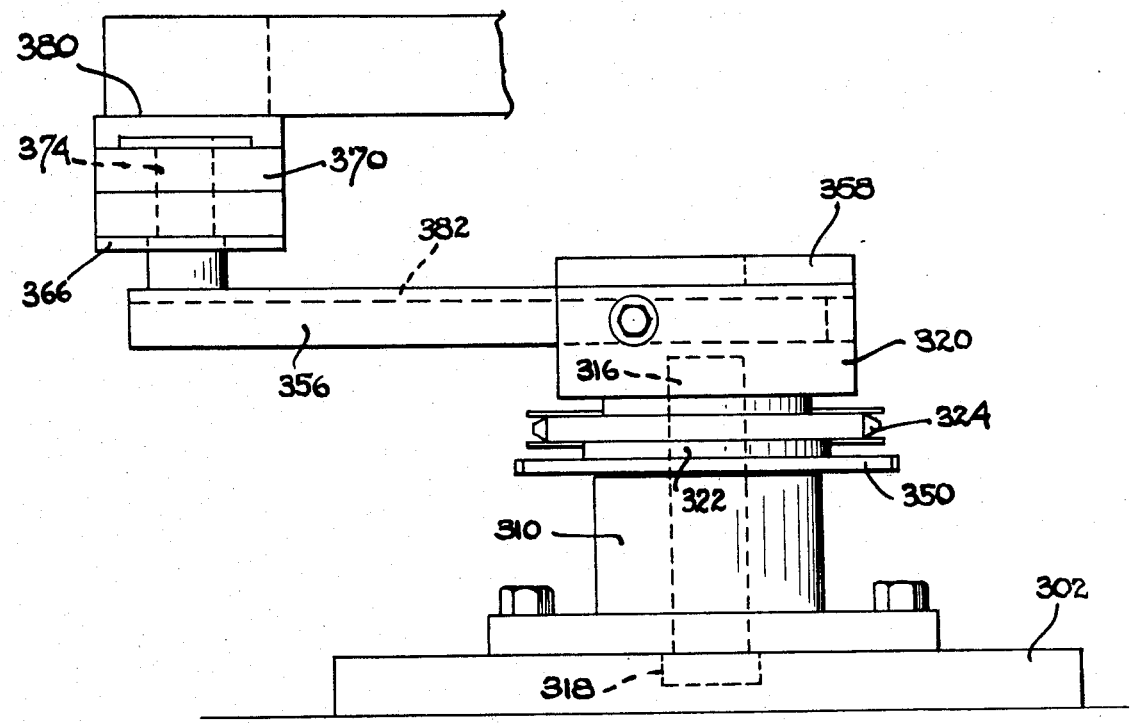

Having thus described the invention in general terms, reference will now be made to the accompanying drawings in which:

FIG. 1 is a front plan view of a welding apparatus constructed in accordance with and embodying the present invention;

FIG. 2 is a top plan view of the welding apparatus constructed in accordance with and embodying the present invention;

FIG. 3 is a horizontal sectional view of a portion of a drive assembly forming part of the apparatus of the present invention and taken substantially along line 3—3 of FIG. 1;

FIG. 4 is rear elevational view, partially broken away and in section of a portion of the carriage forming part of the apparatus of the present invention;

FIG. 5 is a fragmentary vertical sectional view taken along line 5—5 of FIG. 4;

FIG. 6 is a fragmentary sectional view showing one mechanism for securing an end of a crankshaft within a chuck forming part of the apparatus of the present invention;

FIG. 7 is a schematic side elevational view showing a portion of the torch positioning mechanism for positioning the arc welding torch forming part of the apparatus relative to a crankshaft;

FIG. 8 is a schematic side elevational view, somewhat similar to FIG. 7 and showing the torch positioning mechanism in a slightly different position;

FIG. 9 is a vertical sectional view showing a modified form of a crankshaft mounting mechanism used with the tail stock forming part of the apparatus of the present invention;

FIG. 10 is a schematic view, partially in section, showing a flux feed and recirculation system forming part of the apparatus of the present invention;

FIG. 11 is a series of sequential views, including FIGS. 11A through 11D, showing the positioning of the welding torch tip relative to various portions of a crankshaft during rotation thereof;

FIG. 12 is a fragmentary side elevational view showing one lay-down pattern of a weld metal to a portion of a crankshaft in a generally horizontal direction;

FIG. 13 is a fragmentary side elevational view, somewhat similar to FIG. 12, showing the application of a weld metal in a vertical lay-down pattern on a portion of a crankshaft;

FIG. 14 is a fragmentary side elevational view, somewhat similar to FIGS. 12 and 13, and showing the application of a weld metal to a portion of a crankshaft in a slightly different horizontal lay-down pattern;

FIG. 15 is a side elevational view, showing a modified form of torch positioning mechanism constructed in accordance with and embodying the present invention;

FIG. 16 is a vertical sectional view of the torch positioning mechanism of FIG. 15 taken along lines 15—15 of FIG. 15;

FIG. 17 is a vertical sectional view of the torch positioning mechanism of FIG. 15 taken along line 17—17 of FIG. 15; and FIG. 18 is a sectional view showing portions of the torch positioning mechanism of FIGS. 15-17 and taken along line 18—18 of FIG. 15.

DETAILED DESCRIPTION OF A PREFERRED EMBODIMENT

Referring now in more detail and by reference characters to the drawings, which illustrate a preferred embodiment of the present invention, A designates a welding apparatus primarily designed for the welding of crankshafts, such as a crankshaft C. However, it should be understood that the apparatus as described herein could be used in welding other structures having axially off-set portions in the nature of a crankshaft as described above.

The apparatus A generally comprises a main frame 10 with a main control housing 12 mounted toward the left-hand end of the frame 10, in the manner as illustrated in FIGS. 1 and 2 of the drawings. At the right-hand end of the frame 10, an upstanding beam structure 14 is provided. A longitudinally extending base rail 16 extends between the upstanding beam structure 14 and the control housing 12. In addition, a rearwardly located horizontally disposed intermediate support beam 18 extends between the control housing 12 and the beam structure 14. The rail 16 accomodates a shiftable chuck supporting frame 20 for movement therealong, and which frame 20 is often referred to as a "tail stock".

The chuck supporting frame 20 includes a base section 22 having two rollers 24 capable of riding on the rail 16. Extending upwardly from the base section 22 are a pair of vertically arranged legs 26 which carry a chuck 28 often referred to as a "tail stock chuck". The base section 22 of the frame 20 is similarly provided with a downwardly struck retaining strap 30 which is generally of an inverted U-shape and is engageable with the rail 16 and capable of being temporarily locked thereto in any selected position by fasteners (not shown) extendable into apertures 32 formed in the rail 16.

The main frame 10 can have a length of essentially any size to accomodate essentially any type of crankshaft. Further, the shiftable frame 20 with the tail stock chuck 28 carried thereby affords the advantage that the apparatus A can be used with essentially any length and any form of crankshaft, whether or not the crankshaft is of a standard type or a customized design.

The control housing 12 includes a forwardly struck portion 34 (FIGS. 1 and 2) which include a control panel 36 containing basic control features for operation of the main drive mechanism hereinafter described. The control housing 12 also includes a drive section 38 for housing various drive components which constitute a main drive mechanism 40 and which is more fully illustrated in FIG. 3 of the drawings.

The drive section 38 which forms part of the control housing 12 includes a pair of transversely, spaced apart, longitudinal extending beams 42 and which are connected by longitudinally spaced apart, transversely extending cross bars 44. Bolted or otherwise rigidly secured to the cross bars 44 are a pair of pillow blocks 46 which journal a longitudinally extending first drive shaft 48. At its right hand end, reference being made to FIG. 3, the first drive shaft 48 is provided with a chuck 50 which is often referred to as a "head stock chuck". Similarly, mounted within the housing section 38, in relation to the cross beams 44 are a second set of pillow blocks 52 which suitably journal a second drive shaft 54 for reasons which will presently more fully appear.

The drive mechanism 40 comprises a main motor 56 which may be a suitable AC electric motor, having the desired power requirements in order to operate the apparatus A. The motor 56 includes an output shaft 58 which is connected to a suitable gear reducer mechanism 60. In this case, the motor 56 and the gear reducing mechanism 60 are all of conventional construction, and therefore, are neither illustrated nor described in any further detail herein.

The gear reducer 60 similarly has an output shaft 62 on opposite sides thereof and trained around each portion of the output shaft are conventional sprockets 64 and 66 for receiving drive chains 68 and 70, respectively. These sprockets 64 and 66 are, in turn, mounted on suitable clutches 72 and 74, of conventional construction and which are, in turn, mounted on and supported by the output shaft 62.

The clutches 72 and 74 are operable in such manner that when they are disengaged, the sprockets 64 and 66 are free-wheeling and will not be powered for rotation. When the clutches 72 and 74 are engaged, the sprockets 64 and 66 will drive the respective chains 68 and 70. The clutches 72 and 74 are operable by pneumatic operators, e.g., pneumatic cylinders 73 and 75 respectively. These pneumatic operators may be connected to and controlled from a remote location as for example, the control panel 36 or a control panel on a carriage hereinafter described. The control panels would contain control features for actuation by an operator of the apparatus A.

The drive chain 68 is trained around another sprocket 76, the latter of which is, in turn, keyed to or otherwise secured to the second drive shaft 54 in order to cause rotation of the drive shaft 54. In like manner, the drive chain 70 is trained around a similar sprocket 78, the latter of which is again keyed to or otherwise secured to the first drive shaft 48 in order to cause rotation of the drive shaft 48 when the motor 56 is energized. It should be understood in this respect, that pulleys and drive belts of the proper specifications could be utilized in place of the sprockets and chains. For that matter, any other form of drive mechanism could be coupled to the first and second drive shafts 48 and 54, respectively, for causing rotation of the same if proper ratios are used to secure and maintain synchronization.

Also mounted within the housing section 38 is a brake mechanism 80, preferably in the form of a disc brake mechanism, and which includes shiftable brake shoes 82 and a disc plate 84, the latter of which is operatively mounted on the first drive shaft 48. When the brake mechanism 80 is engaged, the clutch mechanism 74 is simultaneously disengaged or vice versa. This feature is desirable inasmuch as it is used to synchronize the rotation of the crankshaft C with a welding torch hereinafter described.

This synchronization is important for reasons hereinafter more fully described in connection with the operation of the apparatus.

The first drive shaft 48 is provided with an axially extending elongate tubular bore 86, and which extends from the left-hand end of the first drive shaft 48 to at least the chuck 50, reference being made to FIG. 3. In order to secure a crankshaft C to the spaced apart chucks 50 and 28, the chucks are manually opende and a crankshaft is located with the ends thereof in each of the spaced apart chucks. Further, in order to prevent the left-hand end of the crankshaft C from "walking" out of the chuck 50, a bolt 88 is provided and extends in the tubular bore 86 of the first drive shaft 48. Further, by reference to FIG. 6, it can be observed that the bolt has an externally threaded section 90 which is capable of fitting within a tubular bore 92 formed within the left-hand end of the crankshaft C. In most cases, the crankshaft C is not provided with such a tubular internally threaded bore 92. However, in this event, it is fairly convenient for the operator to easily form this internally threaded bore 92 without materially affecting the strength characteristics of the crankshaft C.

The tail stock 28 may also be provided with a holding fixture of the type adapted to hold a flange ended crankshaft. In this latter form of crankshaft the end thereof is provided with a diametrally enlarged flange so that mounting in the chuck in the conventional fashion is not available. For this purpose a holding fixture is provided with the tail stock 28 to retain a flange ended crankshaft as hereinafter described in more detail.

The crankshaft C in the embodiment as illustrated and described, is generally of conventional constuction and includes a plurality of crank pins, e.g., the crank pins 94 which have their central axis essentially aligned with the longitudinal central axis of the entire crankshaft C. Further, the crankshaft C includes a plurality of outwardly extending arms often referred to as "crank arms" 96, and extending between a pair of the crank arms 96 are journals 98. The central axis of the journals 98, in this case, are axially offset from the longitudinal center line of the entire crankshaft C.

Extending longitudinally from the control housing 12 toward and to the beam structure 14 is a horizontally disposed longitudinally extending support beam 100 which forms part of the frame structure 10. Further, extending between the control housing 12 and the beam structure 14 is a horizontally disposed drive shaft 102 which constitutes an extension of the second drive shaft 54 and is coupled thereto by a fitting 103. The drive shafts 48 and 54 are normally circular in cross-section and the drive shaft 102 is non-circular and preferably square in cross-section, which are more fully illustrated in FIGS. 1, 2, and 4 of the drawings.

Shiftably mounted on the support beam 100 is a carriage 104 which includes an outer housing 106. The horizontally disposed beam 100 is normally square in shape and is mounted in a position such that one of the corners is presented upwardly. The housing 106 includes an outwardly extending bracket 108 which carries a roller 110 for riding on the beam 100. In this case, the roller is provided with an annularly located V-shaped groove 111 extending around the periphery thereof for riding on the upwardly presented corner of the beam 100. The carriage 104 is also provided with rollers (not shown) which ride upon the horizontal support beam 18, the latter of which is also disposed so that one of the corners is presented upwardly.

Suitably mounted on the carriage 104 is an electric motor 112 and in this case is secured thereto by means of a U-shaped bracket 114, as illustrated in FIG. 4 of the drawings. The motor 112 may preferably be a suitable AC electric motor of sufficient power to cause movement of the carriage 104 longitudinally along the beam 100. The motor 112 is provided with an outwardly extending drive shaft 116, the latter of which carries at its outer end, a drive pinion gear 118. The motor 112, and hence, the drive shaft 116, and the drive pinion gear 118 are angulated such that one flat surface of the beam 100 is provided with a rack segment 120 and the pinion gear 118 is disposed in meshing engagement therewith. In this way, when the motor 112 is energized, the drive pinion gear 118 will rotate and bear against the rack segment 120. As this occurs, the carriage 104 will shift longitudinally back and forth along the support beam 100 and the support beam 18. For this purpose, the motor 112 is preferably a dual-direction drive motor, that is, one in which the drive shaft 116 can be powered for rotation in both clockwise and counter-clockwise directions.

The bracket 116 is vertically shiftable with respect to the carrige housing 106 and may be shiftable on a slide which is slideable on rods (not shown) secured to the housing 106. Further, the bracket 114 and hence the motor 112 are shiftable by means of a pneumatic actuator, e.g., a pneumatic cylinder (not shown) and which may be controlled by an operator from the control panel 36, or from a control panel on the carriage 104 as hereinafter described. In this way, the pinion 118 can be disengaged from the rack segment 120 such that the carriage 106 can be shifted manually if desired.

The carriage 104 includes a mounting plate 122 which carries welding torch 124. The lower end of the torch terminates in a welding tip 126, which is capable of providing a weld material to portions of the crankshaft C. In this case, the welding torch 124 is preferably constructed in the form of a hollow tube which carries a weld wire therein and which can be melted in order to form the weld material. Typically, the tip 126 is located in spaced relationship to the portion of the crankshaft C in which the weld material is to be deposited. An arc is struck through the crankshaft C which is electrically charged, as well as the tip of the torch such that the arc causes the weld wire material in the tip portion to melt and thereby become deposited on the crankshaft C. The arc progressively melts the welding wire as it is actually ejected from the tip of the tourch and the heat of this arc is sufficient that the ejected weld material actually welds to the portion of the crankshaft C in which the tip is disposed. Thus, the weld material may be applied to a crank pin or journal, or for that matter, any of the crank arms.

The mounting plate 122 may also carry a second tube 128 which is capable of supplying another weld wire or flux material, or the like. In like manner, the mounting plate 120 could carry three or more tubes so that two individual sources of weld wire and one source of flux may be provided. One mechanism for suppying flux and recirculating same to the welding torch 124 is hereinafter described in more detail.

During the actual welding operation, it is important for the welding torch, and particularly the torch tip to closely follow the portions of the crankshaft to which weld material is to be applied. Thus, if weld material is to be applied to one of the axially offset portions, as for example, one of the journals, it is necessary for the torch tip to closely follow the orbiting movement of the journal. Moreover, it may be described for the torch tip to shift incrementally axially along the crank journal or the crank pin in order to apply the weld material thereto during the welding operation. For this purpose, the carriage 104 is provided with a torch positioning mechanism 130 located within the housing 106.

The torch positioning mechanism 130 is more fully illustrated in FIGS. 4 and 5 of the drawings. This mechanism 130 is designed to position the support bar 122, and hence, the torch 124 relative to the crankshaft C by movement in two mutually perpendicular planes simultaneously.

The torch positioning mechanism 130 comprises a main plate 131 which may be welded to or otherwise rigidly affixed to the housing 106. A pair of upper transversely spaced apart and longitudinally extending support plates 132 and a pair of lower transversely spaced apart longitudinally extending support plates 134 are secured to the main plate 131. Extending between the paid of upper support plates 132 is a transversely extending, that is, forwardly and rearwardly extending support rod 136. Similarly, positioned between the lower support plates 134 is a transversely extending rod 138 generally located in parallel relationship to the rod 136. Shiftably located on the upper rod 136 is a slide 140 and also shiftably located on the lower rod 138 is a slide 142. The slides 140 and 142 are each provided with outwardly struck portions for carrying a vertically disposed pair of transversely spaced apart guide rods 144, which are more fully illustrated in FIGS. 4 and 5 of the drawings. Vertically shiftably movable on the pair of vertically disposed guide rods 144 is a guide block 146.

Mounted on one flat face of the guide block 146 is a mounting bracket 148 and which is secured thereto by means of bolts 149. This guide block 146 rigidly supports a somewhat downwardly and outwardly angularly disposed positioning rod 150. At its lower end, the positioning rod 150 is ultimately connected to the mounting plate 122 which, in turn, carries the torch 124. The mounting plate 122 may be positionally adjusted on the positioning rod 150 in order to vertically position the tip 126 of the torch 124 relative to the crankshaft C. A set screw adjusting means (not shown) may be provided for this purpose.

In a preferred embodiment of the invention, the mounting plate 122 is provided with a small electric motor 151 which causes the plate 122 to shift upwardly or downwardly along a vertically disposed portion of the positioning rod 150. The electric motor 151 is provided with a pinion (not shown) driven by the motor 151 which meshes with a rack segment (also not shown) on the positioning arm 150 for causing this movement of the plate 122. Further, the electric motor 151 is electrically connected to a suitable operator control on the control panel 36 or a control panel on the carriage as hereinafter described for actuation by an operator of the apparatus A. This electric motor 151 enables vertical positioning of the tip 126 of the torch 124 in order to provide build-up of weld material in a vertical direction, as for example, as illustrated in FIG. 11. In essence, movement of the torch in a vertical direction, either upwardly or downwardly, is caused by the motor 151.

By further reference to FIG. 5, and as indicated previously, it can be observed that the drive shaft 102 is generally square in cross-section. Mounted within the housing 106 of the carriage 104 is a hub 152 which rotatably carries a pulley 154. By reference to FIGS. 4 and 5 it can be observed that the pulley 154 is mounted on the drive shaft 102 for rotation therewith. Trained around the pulley 154 is a drive chain or other timing type drive belt 156 which is similarly trained around a pulley 158 mounted on a longitudinally extending shaft 160, the latter of which forms part of the torch positioning mechanism 130.

Bolted or otherwise rigidly secured to the main plate 131 or alternately one of the transverse end walls of the housing 106 in general alignment with the horizontally disposed stub shaft 160 is a mounting plate 162 which carries a hub 164, and the latter of which is adapted for journaling of a right hand portion of the shaft 160, reference being made to FIG. 4 of the drawings. A brake mechanism 165 located exteriorly of the housing 106 receives the right-hand end of the stub shaft 160 and is actuated when the apparatus A is energized in order to stabilize rotation of the stub shaft 160. The line mechanism 165 is effective to overcome the effect of backlash in the drive chain or like problem. The brake mechanism 165 is actually not only effective in overcoming backlash in the chain 156 but each of the other drive chains in the apparatus as well since the brake 165 puts a tension of proper amount on the various drive components.

Mounted on the left-hand end of the shaft 160, reference being made to FIG. 4, is another mounting block 166. In this case, the block 166 is rotatable with the shaft 160 pursuant to rotation thereof through the drive chain 156. The mounting block 166 carries a follower arm 168 which is pivotally connected to the guide block 146. Further, the position of the follower arm 168 within the mounting block 166 can be adjusted by means of a set screw 170 having a knurled knob 172 at its outer end. The follower arm 168 may be provided with angular or linear indicia, which provides indication of the amount of throw of axially offset portions of the crankshaft. The follower arm 168 is provided with a cam follower 174 which fits within a recess, functioning as a camming opening, and formed in a side wall of the guide block 148.

The follower arm 168 will rotate with the stub shaft 160 and the position thereof is normally adjusted by the set screw 170 in order to conform to the stroke or degree of crank throw of the axially offset portions, e.g., the piston rod journals of the crankshaft C. In one embodiment of the apparatus, the following arm 168 will thus be capable of being positioned for a crankshaft having a maximum throw of about 16 inches to a minimum throw of no axially offset portion with respect to the central axis of the crankshaft C. However, it should be understood that the apparatus A could be designed for a crankshaft of essentially any amount of throw. The term "throw" is used in the art of crankshafts to refer to the distance corresponding to the maximum diameter of axially offset portions of the crankshaft. In other words, the throw is equivalent to two times the radius, measured from axial centerline of the crankshaft to an axial centerline of a journal displaced from the central axis to the crankshaft during rotation thereof.

In accordance with the above outlined construction, it can be observed that as the shaft 160 and the mounting block 166 rotate, the follower arm 168 which is pivotally connected to the guide block 146, will cause the latter to shift vertically up and down along the guide rods 144. Rotation of the shaft 160 will also cause the slides 140 and 142 to simultaneously shift in the transverse direction, that is a movement from back to front and front to back with respect to the apparatus A. In this way, both vertical and transverse movement is simultaneously imparted to the guide block 146 and, hence, the positioning rod 150 and ultimately the welding torch, as aforesaid. Further, it can be observed that as the shaft 102 is connected to the second drive shaft 54, as shown in FIG. 3, and hence, to the main drive mechanism 40 forming part of the apparatus that the positioning mechanism 130 operates in synchronism with the rotation of the main drive shaft 48 which causes rotation of the crankshaft C.

The carriage 104 may also be suitably provided with a control panel 176 for purposes of controlling the operation of the carriage, if not the entire apparatus A. This control panel 176 may be a complement of the control panel 36, or a supplement thereto. Further, it can be observed that the control panel 36, as well as the control panel 176 is located toward the lower portion of the apparatus thereby affording easy accessibility to an operator who may actually sit and watch the operation and control the same during the welding of the crankshaft. Incremental movement of the carriage and hence the torch can be initiated in either the vertical or transverse direction. For this purpose one or both of the control panels will be provided with a transverse job switch and a vertical jog switch to be actuated by an operator.

As indicated previously, weld material is softened and melted for application to the crankshaft through creation of an arc at the torch tip relative to the crankshaft C. Electrical conductivity occurs with respect to the crankshaft by means of a conductive block 177 mounted on the frame located within the drive section 38, in the manner as illustrated in FIG. 3. The conducting block 177 is electrically connected to a suitable source of electrical power through leads 178. Further, the block 177 is provided with a brush or similar contact 180 which bears in electrical contact against the first drive shaft 48, also in the manner as illustrated in FIG. 3 of the drawings. In this same respect, the torch is electrically connected to the same suitable source of current, such that an arc can be created across the crankshaft C and the tip end of the torch since the crankshaft C is in electrical conductivity with the drive shaft 48.

The torch is always positioned in proper timed relationship to the position of the crankshaft in which weld material is to be applied. In this respect, horizontal travel of the carriage 104 and, hence, the torch 124, that is, travel in a direction parallel to the axis of the crankshaft C, is caused by energization of the motor 112.

It can be observed by reference to FIGS. 4 and 5 that the slides 140 and 142 will simultaneously move in response to rotation of the stub shaft 160 and this will provide movement to the torch tip in a generally circular arc which will closely follow the portions of the crankshaft to which weld material is being applied. Further, it can be observed that when the stub shaft 160 rotates through an arc of about 90° F., movement of one of the slides 140 or 142 will momentarily cease and the stub shaft 160 will impart movement momentarily only to the other of the slides. Further, rotation of the stub shaft 160 will cause the arm 168 and hence the guide block to effectively rotate through a circle in the manner as illustrated in FIG. 7.

As indicated previously, the torch tip always closely follows the axially offset portions of the crankshaft and will always truly orbit the central axis of the crankshaft during operation of the apparatus A. The X-Y torch positioner mechanism 130 permits the simultaneous vertical shifting and transverse shifting movement of the guide block 146 to define circular paths, as for example, the circular paths designated as 182 and 184 respectively in FIGS. 7 and 8. It can be observed that as the stub shaft 160 rotates, it will cause the guide plate 146 to shift simultaneously in both the vertical and transverse directions thereby forming an accurate path of movement. In this way, the torch positioning mechanism 130 will cause the tip of the torch 124 to define circular orbits about the center line of the crankshaft C and which are designated 186 and 188 respectively in FIGS. 7 and 8. It can be asserted that the orbits 186 and 188 have generally the same diameter as the circular paths 182 and 184 respectively. Further, the mounting block 122 travels through a path designated as 190 in FIG. 7.

A microswitch 192 is mounted within the housing section 38, as illustrated in FIG. 3 of the drawings and controls horizontal, longitudinal and vertical movement of the welding torch 124. The microswitch 192 is located to be actuated by rotation of the drive shaft 48 and which includes a switch follower 174 activated by a protrusion 196 on the drive shaft 48. Further, the microswitch 192 is provided with a pair of leads 198, in the manner as illustrated in FIG. 3.

The leads 198 may be ultimately connected to the motor 112 and to the motor 151 for energization of the same in response to the actuation of the microswitch 192. The leads 198 would be connected through the control system which would be provided with a horizontal jog switch and a vertical jog switch on either the control panel 176 or both. In this way, the operator could shift the carriage and hence the welding torch 124 incrementally in a horizontal direction, axially with respect to the crankshaft, or vertically with respect to the crankshaft C.

A microswitch 200 is also located within the housing 106 of the carriage 104 and is positioned to be actuated by a cam plate 202 on the upper portion of the guide block 146 in the manner as illustrated in FIG. 5 of the drawings. The microswitch 200 is provided with a pair of leads 204 which are also connected to the control system forming part of the apparatus A and may have control features on either the control panel 36 or the control panel 176, or both. The microswitch 200 indicates when the torch is located at the top center portion of the crankshaft by energization of a light on one or both of the control panels and is primarily useful in indicating when the torch tip is located at the top center portion of the crankshaft during set-up operations.

As indicated previously, it is difficult to mount a flange ended crankshaft onto a conventional chuck forming part of a tailstock, or for that matter a headstock. FIG. 9 illustrates a flange ended crankshaft C having a crankpin 210 and an enlarged flange 212 at the end thereof. The flange 212 is normally provided with a plurality of apertures 214 and if such apertures are not present in the flange, they can be easily drilled therein for the purposes of the present invention.

The present invention uses an alternate form of chuck 216 which is similar to the chuck forming part of the tail stock 28. In this case, the chuck 216 is provided with a plate 218 on the inwardly presented end thereof, that is the end facing the headstock. The plate is secured thereto by means of a short shaft 220 extending into a tubular bore 222 formed in the head stock of the chuck. Moreover, the chuck 216 is normally provided with an outwardly extending shaft 224 which may also have a tubular bore 226 in the manner as illustrated in FIG. 9. A retaining bolt 228 is extended through the bore 216 of the outwardly extending shaft 214 and has a threaded end 230 which extends into and is threadedly secured to an internally threaded recess formed in the shaft 220.

In order to secure the flange ended crankshaft to the modified form of chuck, a plurality of bolts 232 are extended through the apertures 234 formed in the plate 218 and which extend into the apertures 216 formed in the flange 212 of the crankshaft C.

The apparatus of the present invention may optionally be provided with a flux delivery and recirculating system 240 as more fully illustrated in FIG. 10 of the drawings. The system 240 comprises a supply hopper 242 containing the powdered flux material and with a controllable valve 244 located over a discharge 246 formed therein. The valve 244 is controlled from a control mechanism on the control panels 36 or the panel 276 or both. Further, the discharge 246 is provided with a manually operable valve 248 which can be manually adjusted by the operator so as to provide for the proper amount of flux to be discharged when the valve 244 is opened in response to actuation of a suitable control element by the operator.

The excess flux is dropped into a collecting hopper 250 located on the carriage 104 and which is located beneath the flux tube 128. The collecting hopper has an outlet 252 extending into and communicating with a return tube 254 which is provided with a closure plate 256 at one transverse end thereof. Extending through the closure plate 256 and into the return tube 254 is an air delivery tube 258 which delivers a source of air or other gas under pressure to the interior of the return tube 254. The delivery tube 258 is connected to a suitable source of air or other gas under pressure and terminates in the return tube 254 shortly beyond the outlet 252. The return tube 254 is ultimately connected to the hopper 242 to return the unused flux material thereto.

When air is introduced into the tube 258, a venturi effect is created in the return tube 254 such that a vacuum or area of reduced pressure exists in the region 260, as illustrated in FIG. 10 of the drawings. In this respect the air delivery tube 258 is diametrally smaller than the interior diameter of the return tube 254. The area of reduced pressure in the region 260 effectively sucks air and flux in the hopper 250 into the region 260. After this material is urged into the region 262 located by and beyond the end of the air delivery tube 258, the air or other gas emitted from the tube 258 blows the flux material upwardly through the return tube 254 and into the supply hopper 242.

Figure 11D:
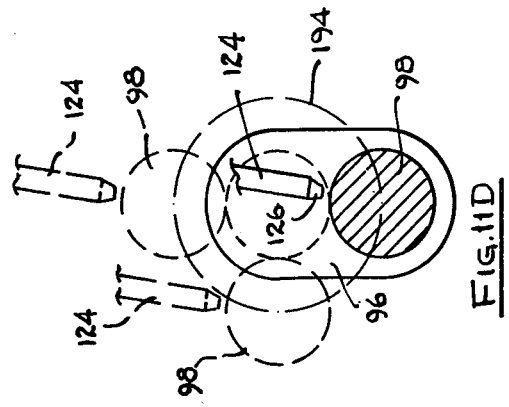
Figure 11C:
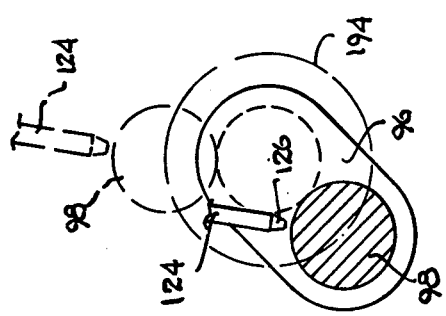
Figure 11B:
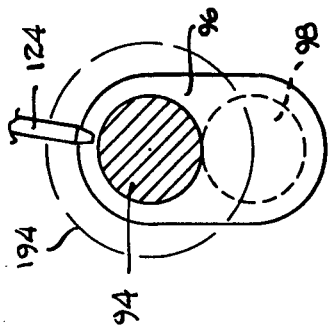
Figure 11A:
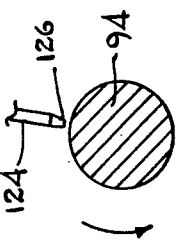

As indicated, the torch can travel longitudinally, that is axially, along the crankshaft C by movement of the carriage 104. Further, the torch can travel in a circular path with respect to the crankshaft C. In this way, it is possible to have the torch tip 126 follow closely in the orbiting movement, of for example, the bearings 98 forming part of the crankshaft 96. FIG. 11 more fully illustrates one of the paths of travel of portions of the crankshaft and of the torch 124. FIG. 11A illustrates the position of the torch with respect to a crank pin 94. In this respect, it is to be observed that weld material can be applied axially along the pin 94 inasmuch as the pin 35 rotates about its axial center line which is coincident with the axial center line of the crankshaft C. FIG. 11B similarly illustrates the application of the weld material to the crank pin adjacent to one of the crank arms 96. FIG. 11C illustrates that application of a weld material to one of the bearings 98 during an orbiting movement of the bearing through a path designated as 194. Finally, FIG. 11D illustrates the location of the bearing 98 and the relative location of the torch 124 during various positions of the bearing 98 through its orbiting movement around the path designated as 194.

FIG. 12 more fully illustrates one from of lay-down pattern of the weld material to one of the crank pins. In this case, it can be observed that the weld material initially is applied in a circumferential band 270 and then the longitudinal travel of the carriage is initiated for a short distance to create a jog 272, which is thereafter followed by an additional circumferential band 274. FIG. 13 illustrates the application of the weld material in a vertical path as opposed to the horizontal path of FIG. 11 and which may occur along one of the vertical portions of the crankshaft. In this way, additional circumferential bands 276 and 278 etc. are built upon each other in the manner as illustrated in FIG. 13. Finally, FIG. 14 illustrates an additional form of welding pattern lay-down in which circumferential bands are actually applied in somewhat of a helical format 280. In this way, linear travel of the torch that is, axially along the crankshaft occurs simultaneously with the rotation of the shaft during the application of the weld material.

It is also possible to shift the tip of the welding torch both vertically and longitudinally even while the tip is orbiting and thereby apply weld material in various patterns. Thus, if the tip were simultaneously and vertically and longitudinally shifted, it would be possible to apply a conically shaped weld layer. Thus, it can be observed, that the weld patterns can be applied to accommodate the damage to the part being welded or to accommodate the size and shape of the part being welded.

In accordance with the above, it can be observed that the nozzle tip of the torch is positioned over and closely adjacent to any portion of the crankshaft, as for example, the crank pin, or the journals, or the crank arms. Further, the torch will follow an orbital path virtually identical to that of, for example, the crank pin and will follow the crank pin as it is orbited through the rotation of the shaft. In this way, the torch maintains an operative spacing relative to the crankshaft so that arcing may occur along with the weld wire being fed throughout virtually similar orbital paths of both the torch and the crankshaft.

When a bead of weld material has been laid on the crank pin for the full axial length thereof, the operation is interrupted and the torch is reoriented into a similar orientation with the next crank pin and this operation continues until all crank pins have had a weld material applied thereto. When the weld material is to be applied to the journals, the torch is then reoriented such that the tip is capable of reaching the journals and the weld material is then applied to the journals, one at a time.

The ability to rotate the chucks and the torch independently of each other enables a weld material to be applied to both the crank pins and rod journals on a crankshaft without having to constantly reset the stroke adjustment. The torch is simply disengaged from one position and set in another proper position for welding of the journals. Thus, for example, when welding in a horizontal direction, as for example, with the laydown pattern of FIG. 12, welding forwardly of the top portion of the journal allows the weld material to cool slightly before it is applied to the backside, which would eliminate the run over of a molten material. The rotation of the crankshaft is initiated immediately with the application of the weld material. The horizontal speed control is adjusted in order to provide the amount of "step-over" which is desired, that is, to create a jog 272 in the weld material. In the vertical direction, the crankshaft is rotated as well, but the horizontal travel of the torch 124 is not initiated.

FIGS. 15–18 illustrate a modified form of torch positioning mechanism 300 which may be used in the illustrated and described apparatus and method of the present invention. The torch positioning mechanism 130 which used an X-Y positioning device as previously described, is highly effective in obtaining a true circular motion in an orbital path with respect to a metal part having axially offset portions. The X and Y movements create a great degree of stability to enable the torch tip to follow the orbital path in closely spaced relationship to a metal part, such as a crankshaft. Further, the torch positioning mechanism 130 is highly effective when used in a relatively clean environment or when used with some form of flux recovery system so as to create a relatively clean environment. However, when the torch tip may be required to move at a relatively slow speed or with several interruptions during the operation, or otherwise, when there is not a relatively clean environment, it is preferable to use the torch positioning mechanism 300.

The torch positioning mechanism 300 would also be located in or on the carriage in the same manner as the torch positioning mechanism 130. Further, it would be powered by the shaft 102 in the same manner that the torch positioning mechanism 130 was powered, and as also hereinafter described in more detail.

The torch positioning mechanism 300 generally comprises a mounting plate 302 which may be fixedly secured to the carriage, preferably in a vertically disposed position and by means of bolts 304. Operatively mounted on the main mounting plate 302 are a pair of rotatable member assemblies 306 and 308. The lower rotatable member assembly 306 is often referred to as a "drive assembly" and the upper rotatable member assembly is often referred to as a "brake assembly". The lower rotatable member assembly 306 is comprised of a bearing support block 310 secured to the plate 302 by bolts 311. The support block 310 is capable of receiving a bearing spacer 312 and roller bearings 314 in the manner as illustrated in FIG. 16 of the drawings. Extending through and journaled by the bearings 314 is a rotatable drive shaft 316 which is provided with an enlarged retaining head 318 on its left-hand end, reference being made to FIG. 16 of the drawings. Mounted on the right-hand end of the drive shaft 316 is a retaining block 320 and which bears against a spacer block 322, the latter of which is, in turn, disposed about the shaft 316 in the manner as illustrated in FIG. 16. Thus, it can be observed that the retaining block 320 constitutes a rotatable member and is rotatable with the drive shaft.

Mounted on the spacer block 322 and being rotatable therewith is a drive pulley 324 which is, in turn, coupled to the second drive shaft 102 by means of a drive belt 325 and which is also coupled around the drive sprocket or pulley 154. In this way, power is provided to the positioning mechanism 300.

The rotatable member assembly 308 is similar to the rotatable member assembly 306 and is similarly comprised of a bearing block 326 having a bearing support bracket 328 located therein and which supports and retains a roller bearing 330. The bearing 330, in turn, permits the journaling of a brake shaft 332. The brake shaft 332 is also provided with a brake mechanism (not shown) at its left hand end in the same manner as the previously described positioning mechanism 130.

Located at the outer (right hand) end of the bearing block 326 is a brake spacer block 334. Further, mounted on the right hand end of the brake shaft 332 and bearing against the spacer block 334 is another retaining block 336 which is a rotatable member and is similar to the slide retaining block 320.

Located between the first rotatable member assembly 306 and the second rotatable member assembly 308 is idler assembly 338 which is comprised of an idler bearing block 340 for retaining an idler bearing support bracket 342 and which, in turn, retains roller bearings 344. Journaled within the roller bearings 344 is an idler shaft 346 which retains a sprocket 348, the latter being disposed in meshing engagement with a sprocket 350 on the shaft 316. The idler sprocket 348 is also disposed in meshing engagement with a sprocket 352 effectively rotatable with the brake shaft 332. In this way, rotation of the drive shaft 316 will cause rotation of the brake shaft 332 in a coordinate time-related manner through the various sprockets 348, 350, 352.

The slide retaining block 320 is provided with an elongate slot 354 capable of receiving a throw adjusting arm and which is rotatable with the slide retaining block 320. Moreover, the arm 356 is retained by means of a cover plate 358 secured to the slide block 320 by means of sheet metal screws 360. In like manner, the block 336 is provided with a throw adjusting arm 362 and which is also rotatable with the retaining block 336 and the brake shaft 332. Further, the arm 362 is retained by means of a cover plate 364 in the same manner as in connection with the slide arm 356.

The arms 362 and 356 can also function as the rotatable members previously described, inasmuch as they will both rotate in a time-related manner, and more specifically, at the same rate of speed.

A torch mounting bracket 366 is secured to one end of the arm 356 and a similar torch mounting bracket 368 is secured to the outer end of the arm 362. Each of the brackets 366 and 368 are designed to retain suitable bearings 370 and 372, and each of which are, in turn, capable of journaling support shafts 374 and 376, respectively. Secured to the outer ends of each of the support shafts 374 and 376 is an insulator plate 378 and a mounting plate 380 often referred to as a mounting member. The mounting plate 380 is sized and located so as to mount the upper end of the welding torch. Thus, the mounting member 380 is the plate which is capable of being moved in a truly orbital path, and in this way, the torch tip or application end of the torch is also capable of being moved in the same orbital path since it is rigidly secured to the mounting plate 380.

By further reference to FIG. 15, it can be observed that the adjusting arm 356 is provided with a gear segment 382 on one surface thereof and which is capable of engaging a sprocket 384. The sprocket 386 may be rotated or turned by means of a manually engagable stub shaft 386 projecting beyond the plate 358 in order to affect the overall length of the arm 356 and hence the amount of "throw" or degree of travel of a torch operated by the positioning mechanism. Further a locking screw 388 is provided to lock the arm in a desired position. It can be observed that the arm 362 is not provided with a gear segment or similar adjusting mechanism although it is provided with a locking screw 390. Thus, when it is desired to change the overall length of the two arms 356 and 362, they can be raised to a vertically disposed position where the amount of movement of the arm 356 will cause a like movement of the arm 362.

The positioning apparatus 300 is highly effective where the rotation of the metal part, such as the crankshaft, is to be slow and hence, orbital movement of a welding torch tip is to be fairly slow. In the case of the previously described X-Y positioning mechanism 130, there may be a tendency to bind at particularly slow speeds. Therefore, the positioning mechanism 300 is highly effective for slow operating speeds. In addition, there are no sliding members inasmuch as everything is rotating and thus, there is less friction to cause any binding effect. Inasmuch as only roller bearings or bearings which accomodate rotating parts are required, these bearings can be sealed. Thus, this positioning mechanism is highly effective where the operating conditions are not clean, as for example, in conditions where a substantial amount of flux dust might result.

Thus, there has been illustrated and described a unique and novel welding apparatus and method for welding crankshafts and like structures and which, therefore, fulfills all of the objects and advantages sought therefore. It should be understood that many changes, modifications, variations, and other uses and applications will become apparent to those skilled in the art after considering this specification and the accompanying drawings. Therefore, any and all such changes, modifications, variations, and other uses and applications which do not depart from the spirit and scope of the invention, or deemed to be covered by the invention which is limited only by the following claims.

Having thus described my invention, what I desire to claim and secure by Letters Patent is:

1. Apparatus capable of applying weld material to a crankshaft having journals and crankpins forming a part thereof, said apparatus comprising:
   (a) frame means,
   (b) means for rotatably supporting said crankshaft with respect to said frame means,
   (c) first drive means on said frame means and capable of being coupled to said crankshaft for causing rotation of said crankshaft,
   (d) a carriage shiftable relative to said frame means, and in a path generally parallel to a longitudinal axis of said crankshaft,
   (e) a welding torch mounted on and movable with said carriage and having a weld material application end in proximity to said crankshaft,
   (f) second drive means operatively connected to said first drive means and capable of generally operating in synchronism therewith,
   (g) a torch positioning mechanism mounted on and movable with said carriage to cause the application end of said torch to follow an orbiting path with respect to said crankshaft, said torch positioning mechanism being operable by said second drive means and having at least two rotatable members capable of being rotated by said second drive means and in coordinated rate of speed,
   (h) a mounting member operatively connected to and movable with each of the rotatable members for movement in an orbital path, said torch being operatively connected to said mounting member for movement in said orbital path so that the application end of said torch can follow in close proximity the rotatable movement of the journal and crankpins of said crankshaft.

2. The apparatus of claim 1 further characterized in that said torch is an electric arc welding torch and said apparatus is provided with means to create an electrical arc between said application end of said torch and said crankshaft.

3. The apparatus of claim 1 further characterized in that an electric motor forms part of said apparatus and said first and second drive means are operable by said electric motor.

4. The apparatus of claim 3 further characterized in that said first and second drive means each comprise a drive shaft and said drive shafts are rotated in synchronized relationship by said electric motor.

5. The apparatus of claim 3 further characterized in that additional motor means is operatively associated with said carriage for driving said carriage and said torch longitudinally with respect to said crankshaft.

6. The apparatus of claim 3 further characterized in that additional motor means is operatively associated with said carriage for driving said carriage and said torch longitudinally with respect to said crankshaft, said position coordinating mechanism causing movement of said torch transversely with respect to the longitudinal axis of said crankshaft and generally vertically with respect to the longitudinal axis of said crankshaft.

7. The apparatus of claim 1 further characterized in that an electric motor forms part of said apparatus and said first and second drive means are drive shafts which are rotatable by said electric motor in synchronized relationship, said first drive shaft having a central bore therethrough, retaining means coupled to said first drive shaft for holding a crankshaft, and bolt means extendable through the central bore of said first drive shaft and said retaining means and capable of being coupled to said crankshaft to retain same in said retaining means.

8. The apparatus of claim 7 further characterized in that first and second clutch means are operatively associated with said respective first and second drive shafts for controlling operation of said drive shafts.

9. The apparatus of claim 7 further characterized in that first and second clutch means are operatively associated with said respective first and second drive shafts for controlling operation of said drive shafts, and control means is operatively connected to said first and second clutch means and being remote therefrom for controlling operation of said first and second clutch means.

10. The apparatus of claim 4 further characterized in that a first switch means is operable in conjunction with said first shaft and a second switch means is operable with a shaft in said positioning mechanism for causing said torch to move in a synchronized manner with respect to said crankshaft.

11. The apparatus of claim 4 further characterized in that said torch positioning mechanism comprises means for causing said second rotatable member to be rotated at a rate of rotation which is coordinated with the rate of rotation of said first rotatable member, and that the mounting member is connected to said first and second rotatable members for causing movement of a welding torch tip so that it can be rotated in an orbital path with respect to said part during rotation thereof.

12. Apparatus capable of applying weld material to a metal part, said apparatus comprising:
   (a) frame means,
   (b) means for rotatably supporting said part with respect to said frame means,
   (c) a first drive shaft coupled to the means for supporting said metal part for causing rotation of said metal part,
   (d) a carriage shiftable relative to said frame means, and in a path generally parallel to a longitudinal axis of said part,
   (e) a welding torch mounted on and movable with said carriage and having a weld material application end in proximity to said part,
   (f) a torch positioning mechanism with said carriage,
   (g) a second drive shaft connected to said torch positioning mechanism and causing operation of same,
   (h) a motor means operatively connected to said first and second drive shafts for causing rotation of same,
   (i) first and second clutch means operatively associated with said respective first and second drive shafts for controlling operation of said drive shafts,
   (j) first electrically energizable control means operatively connected to said first clutch means and being operable by a control remote therefrom for controlling operation of said first clutch means, and
   (h) second electrically energizable control means separate from said first control means and being operatively connected to said second clutch means and being operable by a control remote therefrom for controlling operation of said second clutch means.

13. The apparatus of claim 12 further characterized in that said torch is an electric arc welding torch and said apparatus is provided with means to create an electrical arc between said application end of said torch and said part.

14. The apparatus of claim 12 further characterized in that said motor means comprises an electric motor which forms part of said apparatus and said first and second drive shafts are rotatable by said electric motor in synchronized relationship.

15. The apparatus of claim 14 further characterized in that a brake mechanism is located with respect to said first drive shaft and said brake mechanism being operable to stop rotation of said first drive shaft.

16. The apparatus of claim 14 further characterized in that additional motor means is operatively associated with said carriage for driving said carriage and said torch longitudinally with respect to said part.

17. The apparatus of claim 12 further characterized in that a first switch means is associated with said first control means and is operable in conjunction with said first shaft and a second switch means is associated with said second control means and is operable with a shaft in said positioning mechanism for causing said torch to move in a synchronized manner with respect to said part.

18. Apparatus capable of applying weld material to a metal part, said apparatus comprising:
(a) frame means,
(b) a retaining means on said frame means for supporting one end of the metal part in a rotatable position with respect to said frame means,
(c) releasable clamping means on said frame means for engaging the other end of the metal part and also supporting the part in a rotatable position with respect to said frame means,
(d) a drive motor,
(e) a drive shaft powered for rotation by said motor and being connected to said clamping means for causing rotation of a metal part retained thereby, said drive shaft having a central bore extending therethrough,
(f) bolt means extendable through a portion of the central bore of said drive shaft and said clamping means and capable of being releasably coupled to said drive shaft to releasably retain same in said clamping means, said metal part being primarily supported by said clamping means and retaining means and said bolt means being located to align said metal part, and
(g) a welding torch operatively associated with said frame means and having a weld material feeding end locatable in proximity to said part for applying a weld material thereto.

19. The apparatus of claim 18 further characterized in that said metal part is a crankshaft and said clamping means is a chuck which is openable and closable to engage ends of a crankshaft.

20. The apparatus of claim 19 further characterized in that said chuck is connected to said drive shaft and is provided with an opening to receive said bolt means.

21. The apparatus of claim 18 further characterized in that said part is a crankshaft and said drive shaft is a first drive shaft and said apparatus comprises a second drive shaft, said crankshaft being rotatable by said first drive shaft said apparatus also comprising a torch positioning mechanism for positioning said welding torch relative to the crankshaft, said positioning mechanism being operable by a second drive shaft operable in generally synchronized relationship to said first drive shaft.

22. The apparatus of claim 21 further characterized in that said apparatus comprises a carriage shiftable relative to said frame means, and in a path generally parallel to a longitudinal center axis of a crankshaft, and said torch is an electric arc welding torch carried by said carriage and having a weld material application end in proximity to said crankshaft, said positioning mechanism is located in and carried by said carriage and is operable by said second drive shaft, said positioning mechanism having a member capable of beig movable in a pair of generally mutually perpendicular paths and, said torch being operatively connected to said member for movement in both said paths individually and simultaneously so that the application end of said torch can be positioned in close proximity to the crankshaft during rotation thereof.

23. The apparatus of claim 18 further characterized in that clutch means is operatively associated with said drive shaft for controlling operation of said drive shaft, and control means is operatively connected to said clutch means and being remote therefrom for controlling operation of said clutch means.

24. The apparatus of claim 21 further characterized in that said positioning mechanism comprises:
(a) a first rotatable member mounted for rotation,
(b) a second rotatable member spaced apart from said first rotatable member and mounted for rotation,
(c) means for causing said second rotatable member to be rotated at a rate of rotation which is coordinated with the rate of rotation of said first rotatable member,
(d) means connected to said first and second rotatable members for causing movement of a welding torch tip so that it can be rotated in an orbital path with respect to said part during rotation thereof.

25. A positioning mechanism for use in positioning a tip of a welding torch relative to a part to be welded while being rotated and which part has axially offset portions, said positioning mechanism comprising:
(a) a supporting means,
(b) a first rotatable member mounted for rotation on said supporting means and having a first arm rotatable with said first rotatable member,
(c) a second rotatable member having a second arm rotatable with said second rotatable member and of identical length to said first arm, said second rotatable member being spaced apart from said first rotatable member and mounted for rotation on said supporting means, and being rotated at a rate of rotation which is coordinated with the rate of rotation of said first rotatable member, and
(d) means connected to said first and second arms on said first and second rotatable members for causing movement of a welding torch tip so that it can be rotated in an orbital path with respect to said part during rotation thereof.

26. The apparatus of claim 25 further characterized in that a separate idler means interconnected said first and second rotatable members for causing them to be rotated at a coordinate rate of rotation.

27. The apparatus of claim 26 further characterized in that extensible bars are mounted on said rotatable members and that said means connected to said first and second members is connected to said extensible bars.

28. The apparatus of claim 27 further characterized in that means is provided for causing movement of said extensible bars relative to the associated rotatable members to provide for adjustment of the throw of the means connected to said first and second members.

29. In a welding apparatus for applying weld material to a crankshaft having journals and crankpins forming a part thereof and which apparatus comprises a means for rotatably supporting said crankshaft with respect to said frame means and a drive means capable of being coupled to a crankshaft for causing rotation of said crankshaft, and a carriage shiftable in a path generally parallel to a longitudinal axis of said crankshaft and carrying a welding torch having a weld material application end in proximity to said crankshaft, an improvement comprising a torch positioning mechanism mounted on and moveable with said carriage, said positioning mechanism comprising:
(a) a supporting means,
(b) a first rotatable member mounted for rotation on said supporting means,
(c) a second rotatable member spaced apart from said first rotatable member and mounted for rotation on said supporting means,
(d) means for causing said second rotatable member to be rotated at a rate of rotation which is coordinated with the rate of rotation of said first rotatable member, and
(e) means connected to said first and second rotatable members for causing movement of a welding torch material application end so that it can be rotated in an orbital path with respect to said crankshaft during rotation thereof.

30. The improvement in the apparatus of claim 29 further characterized in that a separate idler means interconnected said first and second rotatable members for causing them to be rotated at a coordinate rate of rotation.

31. The improvement in the apparatus of claim 30 further characterized in that extensible bars are mounted on said rotatable members and that said means connected to said first and second members is connected to said extensible bars.

32. The improvement in the apparatus of claim 31 further characterized in that means is provided for causing movement of said extensible bars relative to the associated rotatable members to provide for adjustment of the throw of the means connected to said first and second members.

33. The improvement in the apparatus of claim 32 further characterized in that said apparatus comprises a drive means which is operatively connected to and capable of operating said torch positioning mechanism.

34. The apparatus of claim 33 further characterized in that an electric motor forms part of said apparatus and said drive means is operable by said electric motor and the improvement comprising additional motor means operatively associated with said carriage for driving said carriage and said torch longitudinally with respect to said crankshaft.

35. The apparatus of claim 29 which further includes supply means to provide flux in proximity to a tip on said torch and in proximity to said metal part,
a hopper below said part receiving excess flux and having a discharge opening,
a return tube communicating with said discharge opening and returning excess flux to said supply means, and
means creating a venturi effect slightly beyond said discharge opening to effectively suck flux in said hopper into said return tube.

36. The apparatus of claim 35 further characterized in that the means to create a venturi effect is a source of air under pressure which also blows said flux back through said return tube into said supply means.

37. The apparatus of claim 36 further characterized in that the supply means is a supply hopper and a valve controllable from a remote source is located in a discharge thereof, and a manually operable valve is also located in the discharge of said supply hopper.

* * * * *